United States Patent
Bhandarkar et al.

(10) Patent No.: US 10,558,554 B2
(45) Date of Patent: Feb. 11, 2020

(54) MACHINE LEARNING BASED SOFTWARE CORRECTION

(71) Applicant: SAP SE, Walldorf (DE)

(72) Inventors: Dinesh Bhandarkar, Karnataka (IN); Biju V. Kalleppilli, Karnataka (IN)

(73) Assignee: SAP SE, Walldorf (DE)

( * ) Notice: Subject to any disclaimer, the term of this patent is extended or adjusted under 35 U.S.C. 154(b) by 180 days.

(21) Appl. No.: 15/907,988

(22) Filed: Feb. 28, 2018

(65) Prior Publication Data
US 2019/0266070 A1 Aug. 29, 2019

(51) Int. Cl.
*G06F 11/00* (2006.01)
*G06F 11/36* (2006.01)
*G06N 20/00* (2019.01)
*G06F 11/07* (2006.01)
*G06F 11/30* (2006.01)
*G06F 11/34* (2006.01)

(52) U.S. Cl.
CPC ...... *G06F 11/3644* (2013.01); *G06F 11/0709* (2013.01); *G06F 11/079* (2013.01); *G06F 11/0751* (2013.01); *G06F 11/3072* (2013.01); *G06F 11/3409* (2013.01); *G06N 20/00* (2019.01)

(58) Field of Classification Search
CPC ............. G06F 11/3409; G06F 11/0709; G06F 11/0751; G06F 11/079; G06F 11/3072; G06F 11/3089
See application file for complete search history.

(56) References Cited

U.S. PATENT DOCUMENTS

| | | | | |
|---|---|---|---|---|
| 2003/0005362 | A1* | 1/2003 | Miller | G06F 11/0727 714/27 |
| 2013/0212440 | A1* | 8/2013 | Rom | G06F 11/0709 714/47.1 |
| 2017/0031816 | A1* | 2/2017 | Lee | G06F 3/061 |
| 2019/0034253 | A1* | 1/2019 | Vedurumudi | G06F 11/079 |
| 2019/0196952 | A1* | 6/2019 | Manchiraju | G06F 11/3696 |

OTHER PUBLICATIONS

"Backpropagation", retrieved from https://en.wikipedia.org/wiki/Backpropagation on or before Mar. 2018, 11 pp.
"Bag-of-words model", retrieved from https://en.wikipedia.org/wiki/Bag-of-words_model on or before Mar. 2018, 4 pp.
(Continued)

*Primary Examiner* — Charles Ehne
(74) *Attorney, Agent, or Firm* — Klarquist Sparkman, LLP

(57) ABSTRACT

Techniques and solutions are described for training and using a classifier based on a machine learning model to analyze performance information to assist in correcting a software bug or performance issue. The performance information can be processed prior to submission to a trained classifier, such as to remove, modify, or format data. A classification result provided by the classifier can be compared with a database to determine whether a solution or target is associated with the classification result. User feedback can be used to provide more accurate suggestions of solutions or targets, as well as to improve the accuracy of the classifier.

20 Claims, 17 Drawing Sheets

(56) References Cited

OTHER PUBLICATIONS

Chablani, M., "Word2Vec (skip-gram model): Part 1—Intuition", retrieved from https://towardsdatascience.com/word2vec-skip-gram-model-part-1-intuition-78614e4d6e0b on or before Mar. 2018, 9 pp.

"Context-Based: Continuous Bag-of-Words (CBOW)", retrieved from https://lilianweng.github.io/lil-log/2017/10/15/learning-word-embedding.html#context-based-continuous-bag-of-words-cbow on or before Mar. 2018, 14 pp.

"Doubts Regarding Word2Vec", retrieved from https://stackoverflow.com/questions/42603417/doubts-regarding-word2vec-continuous-bag-of-words-cbow on or before Mar. 2018, 2 pp.

"From Data to Decisions", retrieved from https://iksinc.online/tag/continuous-bag-of-words-cbow/ on or before Mar. 2018, 7 pp.

"How does Word2Vec's Skip-Gram work" https://becominghuman.ai/how-does-word2vecs-skip-gram-work-f92e0525def4 on or before Mar. 2018, 7 pp.

"An Intuitive Understanding of Word Embeddings: From Count Vectors to Word2Vec" retrieved from https://www.analyticsvidhya.com/blog/2017/06/word-embeddings-count-word2veec/ on or before Mar. 2018, 38 pp.

Jiang, J., "Lecture 21: Word Embeddings", retrieved from https://people.cs.umass.edu/~jpjiang/cs646/21_word_embeddings.pdf, CS646: Information Retrieval, University of Massachusetts Amherst, Nov. 30, 2016, 28 pp.

McCormick, C., "Word2Vec Tutorial—The Skip-Gram Model", retrieved from http://mccormickml.com/2016/04/19/word2vec-tutorial-the-skip-gram-model/, Apr. 19, 2016, 16 pp.

Minnaar, A., "Word2Vec Tutorial Part II: The Continuous Bag-of-Words Model" retrieved from http://mccormickml.com/assets/word2vec/Alex_Minnaar_Word2Vec_Tutorial_Part_II_The_Continuous_Bag-of-Words_Model.pdf, May 18, 2015, 6 pp.

"Question about Continuous Bag of Words" retrieved from https://stats.stackexchange.com/questions/140377/question-about-continuous-bag-of-words on or before Mar. 2018, 3 pp.

Rajasekharan, A., "In Word2Vec CBOW, is the weight matrix for all input context words the same?", retrieved from https://www.quora.com/In-Word2Vec-CBOW-is-the-weight-matrix-for-all-input-context-words-the-same on or before Mar. 2018, 2 pp.

"Vector Representations of Words", retrieved from https://www.tensorflow.org/tutorials/word2vec on or before Mar. 2018, 12 pp.

"Word2Vec (Part 2): NLP With Deep Learning with Tensorflow (CBOW)" retrieved from http://www.thushv.com/natural_language_processing/word2vec-part-2-nlp-with-deep-learning-with-tensorflow-cbow/ on or before Mar. 2018, 9 pp.

"Word2Vec (Part 1): NLP With Deep Learning with Tensorflow (Skip-gram)" retrieved from http://www.thushv.com/natural_language_processing/word2vec-part-1-nlp-with-deep-learning-with-tensorflow-skip-gram/ on or before Mar. 2018, 10 pp.

"Word2vec", retrieved from https://en.wikipedia.org/wiki/Word2vec on or before Mar. 2018, 5 pp.

\* cited by examiner

```
select
    bismt,
    mtart, bel                          710
from mara as m
left outer join rseg as r on m.matnr = r.matnr
left outer join (select
    s.BUKRS,b.belnr as b,
    case when b.belnr like '1%'
    then b.belnr                        720
    else ''
    end bel
    from bkpf as b
    inner join bseg as s on s.bukrs=b.bukrs) on b = r.belnr
where m.matnr='CC_WHEEL_42'

730
(JERequestedAttributes, 316 millisec, ((a1..an) group), BKPF, 576315,
B.BUKRS, B.B, CASE WHEN B.BELNR LIKE '1%' THEN B.BELNR ELSE '' END)

740
(JERequestedAttributes, 316 millisec, ((a1..an) group), Table1..n, 576315,
CASE WHEN Field LIKE 'A%' THEN FieldA ELSE '' END)
```

750  CASE statement filter pushdown issue, Use case before join

Example: (SELECT <fields> case when <field> like 'A%' then <field> else ''
end from <table> left outer join <table2>.....)

```
select bismt, mtart,
    case
        when b like '1%'
        then b
        else ''
    end b
from mara as m                          760
left outer join rseg as r on m.matnr = r.matnr
left outer join
(select b.belnr as b
from bkpf as b
inner join bseg as s on s.bukrs=b.bukrs )
on b = r.belnr
where m.matnr='CC_WHEEL_42'
```

FIG. 7

Operator List:

| Execution Time | CPU Time | Operator Name | Tables Processed | Input Rows | Output Rows |
|---|---|---|---|---|---|
| 0 | 1 | Reduction Phase | BSEG, RSEG, MARA, Temporary Table(s) | n/a | 0 |
| 3 | 3 | Join | BSEG, RSEG, MARA, Temporary Table(s) | n/a | 2 |
| 0 | 0 | JEUniqueColumn | #JE461844141789757627 | 5,376,315 | 5,376,315 |
| 0 | 0 | JEUniqueColumn | #JE461844141789757628 | 5,376,315 | 5,376,315 |
| 0 | 0 | JEStep4 | MARA | 2 | 2 |
| 0 | 0 | JEStep4 | RSEG | 2 | 2 |
| 0 | 0 | JEStep4 | #_SYS_QO_COL_7fe15ced490:401800... | 0 | 0 |
| 0 | 0 | JEStep3b | RSEG | 0 | 0 |
| 0 | 0 | JEStep3b | BSEG | 0 | 0 |
| 0 | 0 | JEStep3b | #_SYS_QO_COL_7fe15ced490:401800... | 0 | 0 |
| 0 | 0 | JEStep3a | RSEG | 0 | 0 |
| 1 | 1 | JEStep2 | #_SYS_QO_COL_7fe15ced490:401800... | 1 | 0 |
| 0 | 0 | JEStep2 | BSEG | 0 | 0 |
| 0 | 0 | JEStep2 | MARA | 2 | 2 |
| 0 | 0 | JEStep1 | RSEG | 0 | 0 |
| 0 | 0 | JEStep1 | #_SYS_QO_COL_7fe15ced490:401800... | 0 | 0 |
| 0 | 0 | JEShortcut | | 0 | 0 |
| 316 | 255 | JERequestedAttributes | BKPF | 5,376,315 | 5,376,315 |
| 0 | 0 | JERequestedAttributes | MARA, Temporary Table(s) | n/a | 2 |

FIG. 8

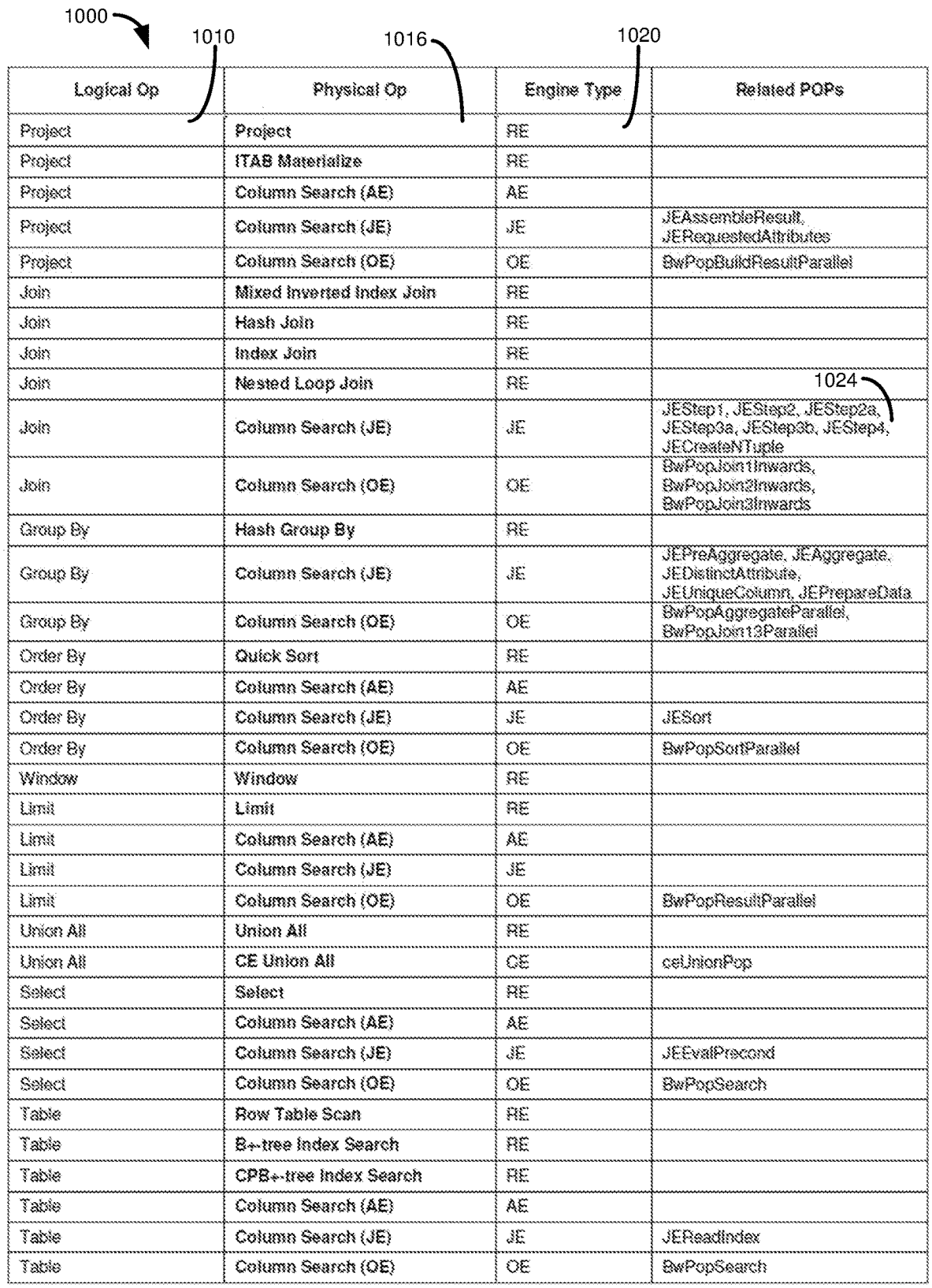

| Logical Op | Physical Op | Engine Type | Related POPs |
|---|---|---|---|
| Project | Project | RE | |
| Project | ITAB Materialize | RE | |
| Project | Column Search (AE) | AE | |
| Project | Column Search (JE) | JE | JEAssembleResult, JERequestedAttributes |
| Project | Column Search (OE) | OE | BwPopBuildResultParallel |
| Join | Mixed Inverted Index Join | RE | |
| Join | Hash Join | RE | |
| Join | Index Join | RE | |
| Join | Nested Loop Join | RE | |
| Join | Column Search (JE) | JE | JEStep1, JEStep2, JEStep2a, JEStep3a, JEStep3b, JEStep4, JECreateNTuple |
| Join | Column Search (OE) | OE | BwPopJoin1Inwards, BwPopJoin2Inwards, BwPopJoin3Inwards |
| Group By | Hash Group By | RE | |
| Group By | Column Search (JE) | JE | JEPreAggregate, JEAggregate, JEDistinctAttribute, JEUniqueColumn, JEPrepareData |
| Group By | Column Search (OE) | OE | BwPopAggregateParallel, BwPopJoin13Parallel |
| Order By | Quick Sort | RE | |
| Order By | Column Search (AE) | AE | |
| Order By | Column Search (JE) | JE | JESort |
| Order By | Column Search (OE) | OE | BwPopSortParallel |
| Window | Window | RE | |
| Limit | Limit | RE | |
| Limit | Column Search (AE) | AE | |
| Limit | Column Search (JE) | JE | |
| Limit | Column Search (OE) | OE | BwPopResultParallel |
| Union All | Union All | RE | |
| Union All | CE Union All | CE | ceUnionPop |
| Select | Select | RE | |
| Select | Column Search (AE) | AE | |
| Select | Column Search (JE) | JE | JEEvalPrecond |
| Select | Column Search (OE) | OE | BwPopSearch |
| Table | Row Table Scan | RE | |
| Table | B+-tree Index Search | RE | |
| Table | CPB+-tree Index Search | RE | |
| Table | Column Search (AE) | AE | |
| Table | Column Search (JE) | JE | JEReadIndex |
| Table | Column Search (OE) | OE | BwPopSearch |

JE – Join Engine
OE – OLAP Engine
AE – Analytic Engine
RE – Row Engine

FIG. 10

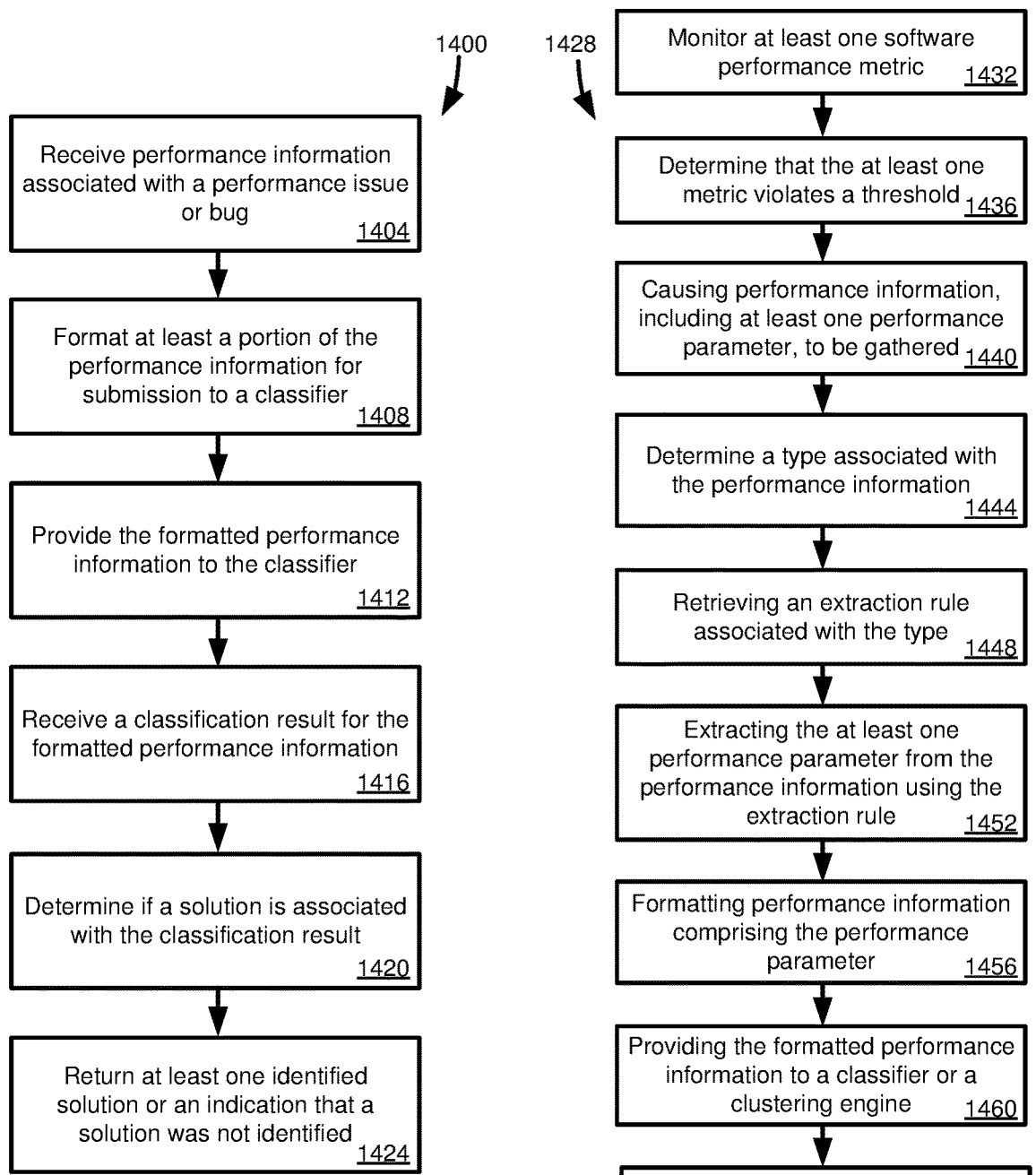

MACHINE LEARNING BASED SOFTWARE CORRECTION

FIELD

The present disclosure generally relates to automated or semi-automated correction of software coding errors, or bugs, or performance issues. Particular implementations relate to the training or use of a machine learning-based classifier.

BACKGROUND

Determining and correcting the source of software errors or performance issues, commonly referred to as debugging, remains a major problem in software development. Several studies have estimated that debugging consumes over fifty percent of software development time and costs. Although software configuration management systems and formalized debugging approaches can assist in debugging efforts, debugging can remain a tedious, time consuming task.

Further, even after release bugs can arise, or performance issues identified. In some cases, a program may function, but it may suffer from performance issues (e.g., unexpectedly or undesirably high execution time, processor use, memory use, network use, or the like). Or, a program may function as desired in some scenarios, but fail to function, or suffer from performance issues, in other scenarios. Detecting and resolving these bugs or performance issues can be time consuming. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for training and using a classifier based on a machine learning model to analyze performance information to assist in correcting a software bug or performance issue. The performance information can be processed prior to submission to a trained classifier, such as to remove, modify, or format data. A classification result provided by the classifier can be compared with a database to determine whether a solution or target is associated with the classification result. User feedback can be used to provide more accurate suggestions of solutions or targets, as well as to improve the accuracy of the classifier.

A method is provided for obtaining classification results, such as in the form of a performance indicator that may be associated with a solution or target for correcting a performance issue or bug. Performance information is received. The performance information is associated with the performance issue or bug and with software execution during the occurrence of the performance issue or bug. The performance information includes at least one performance parameter (e.g., execution time or resource use) and at least one software feature (e.g., program, program component, program operation or process, etc.) associated with the at least one performance parameter.

At least a portion of the performance information, including the at least one software feature, is formatted for submission to a classifier using a machine learning model. The formatted performance information is provided to the classifier. A classification result is received. It is determined if a solution is associated with the classification result, such as by querying a database. Based on the determining, at least one identified solution, or an indication that a solution was not identified, is returned.

According to another embodiment, a method is provided for automatically analyzing performance information. At least one software performance metric is monitored. It is determined whether at least one metric violates a threshold. Performance information, including at least one performance parameter, is caused to be gathered. A type associated with the performance information is determined. An extraction rule associated with the type is received. At least one performance parameter is extracted from the performance information using the extraction rule. Performance information that includes the performance parameter is formatted. The formatted performance information is provided to a classifier or a clustering engine. A classification or clustering result is received. A solutions database is queried for a solution using the classification or clustering result. At least one identified solution or an indication that a solution was not identified is returned.

According to a further aspect, a method is provided for training a classifier based on a machine learning algorithm. A plurality of training data objects are received. The plurality of training data objects include performance information associated with software associated with a performance issue or bug and with software execution during the occurrence of the performance issue or bug. The performance information includes at least one performance parameter and at least one software feature associated with the at least one performance parameter. The training data objects include at least one performance indicator, which is associated with a solution to the performance issue or bug. The training data objects further include a solution to the performance issue or bug.

For the plurality of training data objects, at least a portion of the performance information is formatted for submission to a machine learning algorithm. A machine learning model is trained with the formatted performance information to provide a trained classifier. The trained classifier outputs a performance indicator in response to an input test data object. The input test data object includes performance information. The output performance indicator can be submitted to a solutions database to provide a suggested solution or an indication that a solution was not identified.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 7 presents an example SQL statement causing a performance issue, a suggested solution to the performance issue, a corrected SQL statement using the suggested solution, and raw and formatted performance information associated with the example SQL statement.

FIG. 8 is an example application screen providing performance information that can be used to identify errors associated with SQL statement execution.

FIG. 10 is a table of example operators of a JOIN engine that can be used to categorize performance information and which may be associated with a bug or performance issue.

FIG. 14A is a flowchart illustrating operations in a method of obtaining classification results using performance information.

FIG. 14B is a flowchart illustrating operations in a method of automatically analyzing performance information.

DETAILED DESCRIPTION

EXAMPLE 1

Overview

Figure 1:
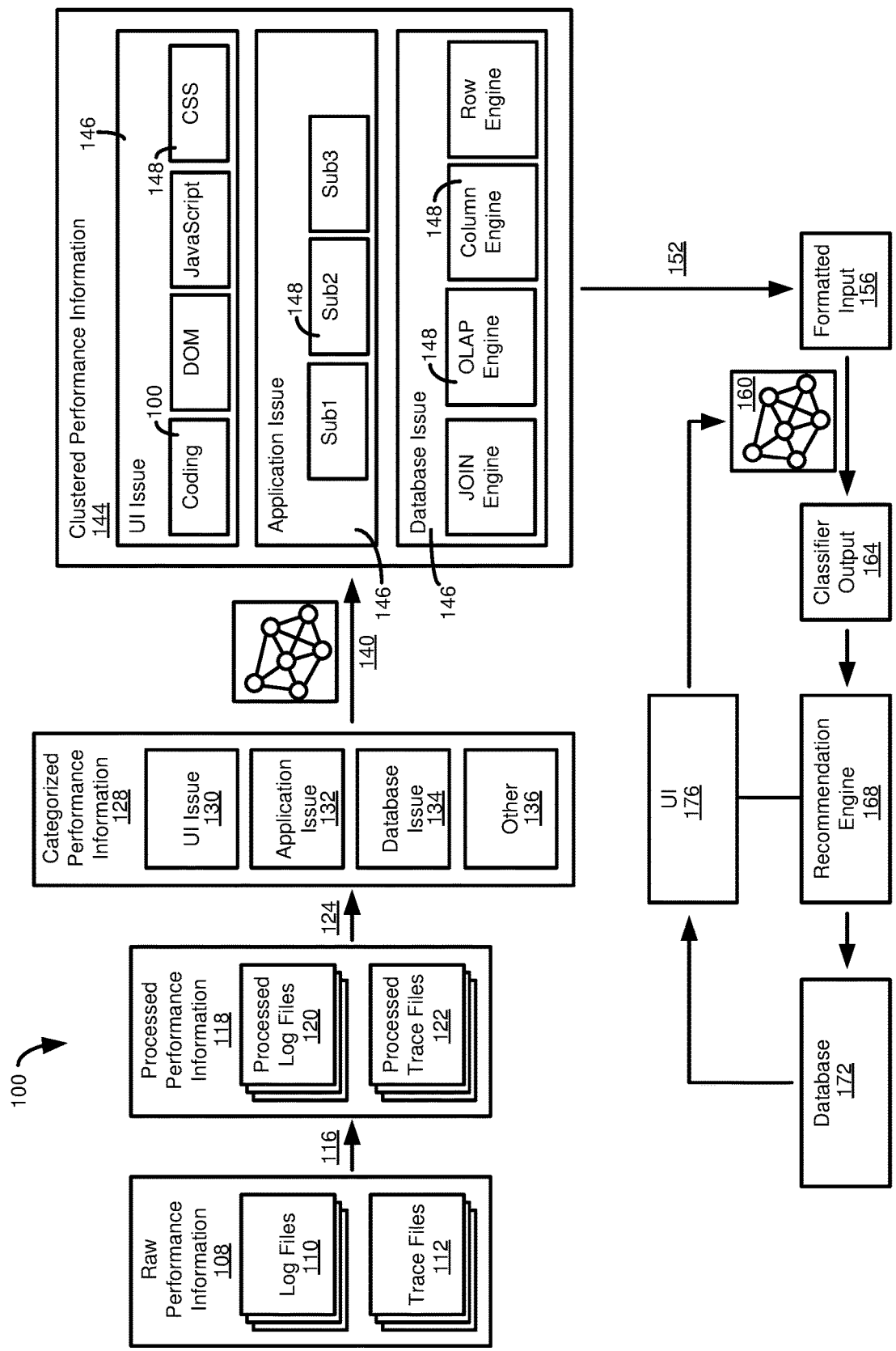
FIG. 1 is a schematic diagram illustrating how raw performance information can be processed and submitted to a classifier using a machine learning model to suggest a solution or target for a software bug or performance issue.

Software is ubiquitous in today's society. Software is being incorporated into an increasing number of devices, developed and improved for an ever increasing number of applications, and is growing ever more complex. Determining and correcting the source of software errors or performance issues, commonly referred to as debugging, remains a major problem in software development. Several studies have estimated that debugging consumes over fifty percent of software development time and costs.

As used herein, a bug, also referred to as a coding error or software defect or fault, refers to code behavior that produces unintended or undesirable behavior. Bugs can result from failure to follow the correct syntax of a programming language. Bugs can also result from improper code semantics or code design, such as mathematical operator errors (e.g., division by zero), variables that may go out of bounds (e.g., a variable that causes an array to go out of bounds), memory leaks, security flaws, or bugs that result from improper interaction of software modules or components. Categories of bugs can include arithmetic errors, logic errors, syntax errors, resource errors, threading errors, interface errors, or errors resulting from the interaction of different programmers. Bugs can be associated with these and other types, and in some cases error messages or codes, including error messages from exception handling routines. Further, performance information, such as logs or traces, can include performance parameters (e.g., execution time or resource use) that can be associated with a code error or code that can be improved.

Even after software is released, bugs can be identified, or performance issues identified, typically requiring software developers to determine the source of an error and deploy an appropriate correction. This problem can be compounded when a user, such as a business, requests customization to a standard software program, or customizes the software themselves. In some cases, a program may function, but it may suffer from performance issues (e.g., unexpectedly or undesirably high execution time, processor use, memory use, network use, or the like). Or, a program may function as desired in some scenarios, but fail to function, or suffer from performance issues, in other scenarios. Performance issues can arise even if code technically does not contain a bug (e.g., the program does not crash, and may not even invoke error handling routines, but has suboptimal operation). Detecting and resolving these bugs or performance issues can be time consuming.

Software development can be very specialized. As developers work on a particular software program, they may be able to more efficiently determine the source of a software bug or performance issue and to develop and deploy a correction. However, if the developer leaves or is reassigned, the knowledge can be lost, which can result in work being redone to fix a bug or performance issue that previously occurred, or more time and resources being needed to fix a new error. Even if the developer is still in the same position, that developer may not assigned to fix the issue when it arises again, and a different developer assigned to the task may have to redevelop the solution.

Particularly for programs that have been deployed (e.g., have been installed and are in use), the complexity of identifying and correcting bugs and performance issues can be even greater. For example, a program, such as an application, may operate using one or more frameworks, program libraries, and services, such as accessing a database. If a bug or performance issues arises, a first step may be to determine whether the bug or performance issue is being cause by the application, one of the frameworks, a component of a program library, a service, or a combination of these. It can be difficult to find a developer with expertise in every software (or hardware) component involved in program execution, which can lead to significant time being spent passing the issue between multiple developers, or a single developer having to learn the operation of multiple components, also resulting in further expense.

Many software programs have logging capabilities, which can be automatically maintained or can be selectively activated, to track program execution. For example, undesired program behavior can result in a log entry. An exception handling routine, in some cases, can generate a log entry as part of the handling. Logs can be reviewed by developers to help identify the presence, or possible cause, of a bug or performance issue.

In some cases, a bug or performance issue may not be documented in a log, or the information in the log may not be sufficient to identify its cause. Some programs (or programs that can monitor other programs) can generate program traces that can track aspects of program execution. For example, a database system may have tracing functionality to monitor query execution, such as monitoring the execution time of various operations or suboperations of query execution. Reviewing a trace can identify operations that are associated with the bug or performance issue. For example, a particular SQL operation may be implicated if it executes for an abnormally long time.

Other components can provide similar functionality for recording performance information. Some programming languages or frameworks can allow for the monitoring of particular components of program execution, such as execution of particular method calls, including the time taken for their execution. A framework or operating system can also monitor parameters, such as resource use of particular programs (e.g., CPU, memory, or network use). A user interface component can track the time taken to generate user interface screens or the time taken to execute a request for data.

Even though software components may provide logging or tracing functionality, as mentioned above, a particular developer may not know how to access or interpret the logs, or to activate and interpret the tracing. This problem is compounded when multiple programs are involved. Even after the problem is identified, a solution still needs to be developed and deployed.

The present disclosure provides various technological innovations that can provide improved detection and resolution of bugs and performance issues. In one aspect, the present disclosure provides a tool that can automatically detect performance issues. For example, rules can be defined that measure key performance indicators defined for a program or software component. If one or more key performance indicators indicate a performance issue, such as being higher or lower relative to a threshold, the tool can automatically cause performance measurements, such as those reflected in logs or traces, to be analyzed, and optionally generated. In other cases, the generation or analysis of performance information can be triggered in response to error detection, including as part of an error handling routine. The analysis can be used to automatically generate a code correction, suggest a resolution to a developer, or alert the developer to a particular program, program component, or code fragment that may be causing a bug or performance issues.

In other cases, a developer or administrator can manually cause the generation and analysis of performance information, such as log and trace files, upon observing or learning of a performance issue or bug. In further cases, a developer or administrator can manually add a log or trace to be automatically analyzed. For example, a saved log or trace file can be submitted for analysis.

Analyzing performance information can include categorizing the performance information. Categorization can be based on various criteria, such as by software component or function. For example, the performance information can be classified as representing user interface components, application components, or database components. The performance information can be subcategorized, if desired, including using automatic classification tools, such as deep natural language processing. Subcategorization can be used to suggest particular subcomponents that might be responsible for a performance issue or bug. For instance, for performance information initially categorized as being in the database layer, the subclassification may suggest that the issue lies with a particular database engine, such as a JOIN engine, OLAP engine, row engine, or column engine.

Categorized information or subcategorized performance information can be analyzed, such as by being filtered, to narrow down a potential issue to particular operations reflected in the performance information. In some cases, this can result in particular categories, subcategories, or individual performance information items being selected for further analysis, or being excluded from further analysis. For instance, if performance information is received for multiple categories or subcategories, but only performance information for one category is shown as violating a particular KPI or metric, only that performance information may be further processed. In other cases, a greater amount, including all, performance information is processed. For example, performance information from operationally linked components may be further processed.

In particular aspects, performance information can be formatted prior to further analysis. For example, the performance information can be converted to a common or generic format, which can allow comparisons between code or other program components that carry out similar functions, and may generate similar bugs or performance issues, although some specific details (e.g., particular variables, method calls, tables accessed, etc.) may differ between the code or other program components.

The performance information can be analyzed using a machine learning technique. For example, the performance information can be converted to one or more word vectors and analyzed using embedded wording techniques such as Continuous Bag of Words or Skip Gram. The analysis can generate a label or contextual code or operations that are likely associated with the performance issue or bug.

The code, operations, or other output of the machine learning algorithm can be used to search a database of possible solutions. If a solution is identified, it can be presented to a user who can then evaluate and potentially implement the solution. In other cases, the solution may be automatically implemented. Feedback can be provided to the system as to whether a suggested solution was correct, which feedback can be used to further refine the machine learning classifier or adjust solution rankings in the database.

If a solution is not identified, one or more potential code or program features, also referred to as targets or "hotspots," may be suggested to a user. The user can then analyze the suggested hotspot and may develop a solution to the issue. Feedback can be provided by the user as to whether the suggested hotspot was accurate, which can be used to further refine the machine learning classifier or adjust hotspot rankings in the database. If a solution was identified, the solution can be added to the database.

If no solution or hotspot was identified, but the user identifies a solution or hotspot, the solution or hotspot may be added to the database.

In at least some cases, an organization may have a large amount of historical data that can be used to train a classifier. For instance, a significant portion of software available from SAP, SE, of Walldorf, Germany, is written in the ABAP programming language. Particularly as it is at least partially an interpreted language, ABAP code can be updated by applying correction instructions to source code, rather than replacing entire source code files or replacing object or executable code files. For instance, updates, such as those in the form of correction instructions, can be created and manipulated using the ABAP WORKBENCH of SAP SE and propagated and applied using the SAP HANA TRANSPORT FOR ABAP system, also of SAP SE. The correction instructions, as well as performance information and performance indicators (e.g., programs, program components, or program operations) can be used to train a machine learning model.

Historical information from prior incidents of bugs or performance issues can be used to train a machine learning algorithm to provide a classifier. The historical information can include performance information associated with the incident, identifications of the source of the associated bug or performance issue (e.g., the particular code or operators, etc.), and solution information for correcting the issue (e.g., ABAP correction instructions or notes).

Thus, disclosed technologies can provide advantages in identifying and correcting software bugs and performance issues, which can reduce the manual effort needed to both find and correct bugs and performance issues. The disclosed technologies can improve the operation of a computer by correcting such bugs and performance issues, which can improve execution time and the use of computing resources, such as CPU, memory, and network use. Disclosed technologies can address the technical problem of software bugs and performance issues through the technical solution of a trained classifier that can be used to provide suggested solutions or target areas to investigate to locate the source of the bug or performance issue. Disclosed technologies can be implemented as a centralized resource, such that the feedback of multiple users can be aggregated and made available, and can be used to improve the quality of the suggested solutions and target areas, to add new solutions or target areas to a database that can be accessed using the results of the classifier, and to provide training data that can be used to improve the accuracy of a classifier. Technical solutions also include features for classifying performance information and formatting performance information to be input to the classifier.

EXAMPLE 2

Example Processing and Use of Performance Information

FIG. 1 is a block diagram illustrating a scenario 100 of how performance information can be provided to a classifier to provide a recommended solution, or investigation target, for a bug or performance issue. The environment 100 includes raw performance information 108. The raw performance information 108 can include one or more log files 110, one or more trace files 112, or other types of information. Although referred to as files, the log, trace, or other performance information can be provided in other ways than in the form of a file. For example, the information can be obtained directly from memory.

The raw performance information 108 may relate to a common software component or function, or relate to a plurality of components or functions. For instance, the performance information 108 may be provided from one or more applications (e.g., applications that are directly accessible by a user, such as an end user), a user interface that accesses an application, one or more frameworks (e.g., programs that support the operation, such as providing services to an application), one or more operating systems, and applications or other services accessed by an application, such as a database system. The raw performance operation can include values associated with various parameters of execution of the components or functions, such as execution time or resource use (e.g., CPU, memory, network, etc.).

In a processing step 116, the raw performance information 108 is processed to provide processed performance information 118, including processed log files 120 and processed trace files 122. In at least some cases, at least some of the raw performance information 108 is not processed and is used in its raw form in subsequent analysis steps.

The processing 116 can include removing particular types of performance information. For instance, desired information can be extracted, or undesired information can be removed from a log or trace, such as removing individual log or trace entries. Undesired information can include information that is not used in subsequent processing, such as performance metrics for particular software components, or particular types of performance metrics.

In a specific example, information is excluded from subsequent processing that relates to software components that are not modifiable by a developer, or which do not reflect (e.g., provide information that can be used to analyze) potential bugs or performance issues of software components that are modifiable by a developer. As an example, components of an operating system, library, or repository provided by a third party (or which are otherwise not modifiable by a developer) are excluded. In a specific example, in C++, elements of core C++ or C libraries (e.g., the C standard library) may be excluded.

A first level classification step 124 can be applied to the processed performance information 118, the raw performance information 108, or a combination thereof. The classification 124 is shown as providing categorized performance information 128, which can include categories such as "UI Issue" 130, "Application Issue" 132, "Database Issue" 134, and other categories 136.

The first level classification 124 can employ one or more rules, which can be maintained in a rule repository (not shown). The rules can specify criteria for classifying performance information. Classification criteria can include classifying performance information via file extension or file type. For instance, files with a .har or .hwl extension may be classified as "user interface" files with .plv or .csv extensions may be classified as "database," and files with .txt or .csv extensions may be classified as "application."

Classification criteria can also be based on metadata associated with the performance information (e.g., metadata indicating a type of performance information, a source program, a program that generated a log or trace, etc.). Classification criteria can also be based on contents of the performance information, such as whether the contents include programming language elements (e.g., elements associated with ABAP, C++, JAVA, JavaScript, etc.), database operations (e.g., SQL statements or tokens, database operators, or database suboperators), or user interface elements (e.g., JAVA classes providing user input functionality). Classification criteria can also be based on comparing contents of the performance information, such as execution times, to one or more thresholds, where, for example, execution times that meet a threshold are associated with a first classification and execution times that do not meet the threshold are associated with a second classification. In at least some cases, classification at 124 can occur prior to the processing 116, which can allow information to be used for classification that is not needed for subsequent steps. Or, the rule can be used to define an extraction process.

If two extensions, or other classification criteria, have the same value, other classification criteria can be used to determine a final classification. For example, if two classifications might be associated with a .csv file extension, criteria such as execution time or the presence or absence of SQL operators or ABAP elements may be used to distinguish between two categories, such as "application" and "database." Or, execution time alone can be used to determine a classification (or subclassification) type.

In at least some implementations, classification, at least for certain categories, can include a multilevel classification. A multilevel classification can be carried out in a similar manner to the classification at 124, where the presence of particular keywords, for example, can be used to classify all or a portion of performance information into a subcategory. In some cases, an entire source of performance information (e.g., an entire log or trace) can be subclassified. In other cases, portions of performance information can be subclassified, and can be maintained with performance information having a different subclassification or can be extracted into a separate group having the particular subclassification. If desired, a tag, such as a metadata identifier, can be applied to categorized or subcategorized information.

In a particular aspect, subcategorization can be carried out, at least to a portion of the performance information (typically the categorized information 128, but in other cases, the raw performance information 108 or the processed performance information 118, in which case the classification can be a first level classification, a second level classification, a higher level classification, or a combination thereof) using a machine learning algorithm in process 140. The machine learning algorithm can be, for example, a deep natural language processing algorithm.

The process 140 (or another subclassification process) can provide clustered performance information 144. The clustered performance information 144 can be distributed among different categories 146 and optionally one or more subcategories 148. For example, the "user interface" category 146 can include subcategories 148 relating to coding issues, issues with a document object model, JavaScript issues, and CSS issues. A "database" category can include subcategories 148 relating to various database engines, such as a JOIN engine, an OLAP engine, a column engine, or a row engine.

As described, classification or subclassification can be automated. In other cases, the raw performance information 108 and the processed performance information 118 can be classified or subclassified in another manner, such as manually according to user input or by a metadata field associated with the performance information.

The clustered performance information 144 can be formatted using process 152 to provide formatted input 156 for a classifier 160 based on a machine learning model. Formatting can include removing certain portions or replacing certain portions of the performance information. As an example, the classifier 160 may have been trained using training data where SQL operators were left in the training data, but information as to specific fields and tables accessed by the operators was removed. In this manner, performance information can be more directly compared. In many cases, a problem may lie with how the operators are used, or with other software code or components that is functionally associated with the operators. Even if the problem lies with the data being processed, this can be revealed using training and classification data that does not include the tables and fields (e.g., a possible solution may be to reformat a particular table or to confirm table data is in the correct format).

The classifier 160 can use any suitable machine learning technique. Generally, the machine learning technique is a supervised machine learning technique, such as decision trees, artificial neural networks, instance-based learning, Bayesian methods, reinforcement learning, inductive logic programming, genetic algorithms, support vector machines, or combinations thereof. In a particular example, the classifier 160 uses a word embeddings based technique, such as Continuous Bag of Words or Skip Gram. The formatting 152 can include formatting clustered (or other) performance information 144 for use in the classifier 160 (e.g., converting the performance information to one or more word vectors).

In some cases, the classifier 160 can include, or can be replaced by, a clustering engine (e.g., FIG. 1 can include a clustering engine 160). When included, the clustering engine can use machine leaning or non-machine learning based approaches. The clustering engine can provide a clustering result, which can otherwise be used in a similar manner as a classification result from the classifier 160.

The classifier 160 produces an output, or classification result, 164. The output 164 can be code, code fragments, programs, program components, or other output that can be used to identify a likely source of a performance issue or bug. In some cases, the output 164 can represent a target, such as code or components that a developer may investigate as a problem source.

The output 164 can be supplied to a recommendation engine 168. The recommendation engine 168 can search a database 172 for information related to the output 164, such as to identify one or more possible solutions to the bug or performance issue, or to suggest one or more targets that may be responsible for the bug or performance issue. Possible solutions or targets, and other information, such as the output 164, can be provided to a user through a user interface 176.

The user interface 176 can also allow a user to provide feedback to the recommendation engine 168, the database 172, or the classifier 160. For example, new solutions can be added to the database 172, or provided to the recommendation engine 168 and used to provide more accurate target and solution rankings. If the user determines that the output 164 was accurate or inaccurate, that feedback can be used to update weights used by the classifier 160. Similarly, new associations can be created between formatted input 156 and input received through the user interface, such as backpropagating the user input as output 164 into the classifier 160. Thus, the recommendation engine 168 and the classifier 160 can become more accurate and comprehensive as the environment 100 is used.

EXAMPLE 3

Example Classification and Identification of Solution or Target

Figure 2:
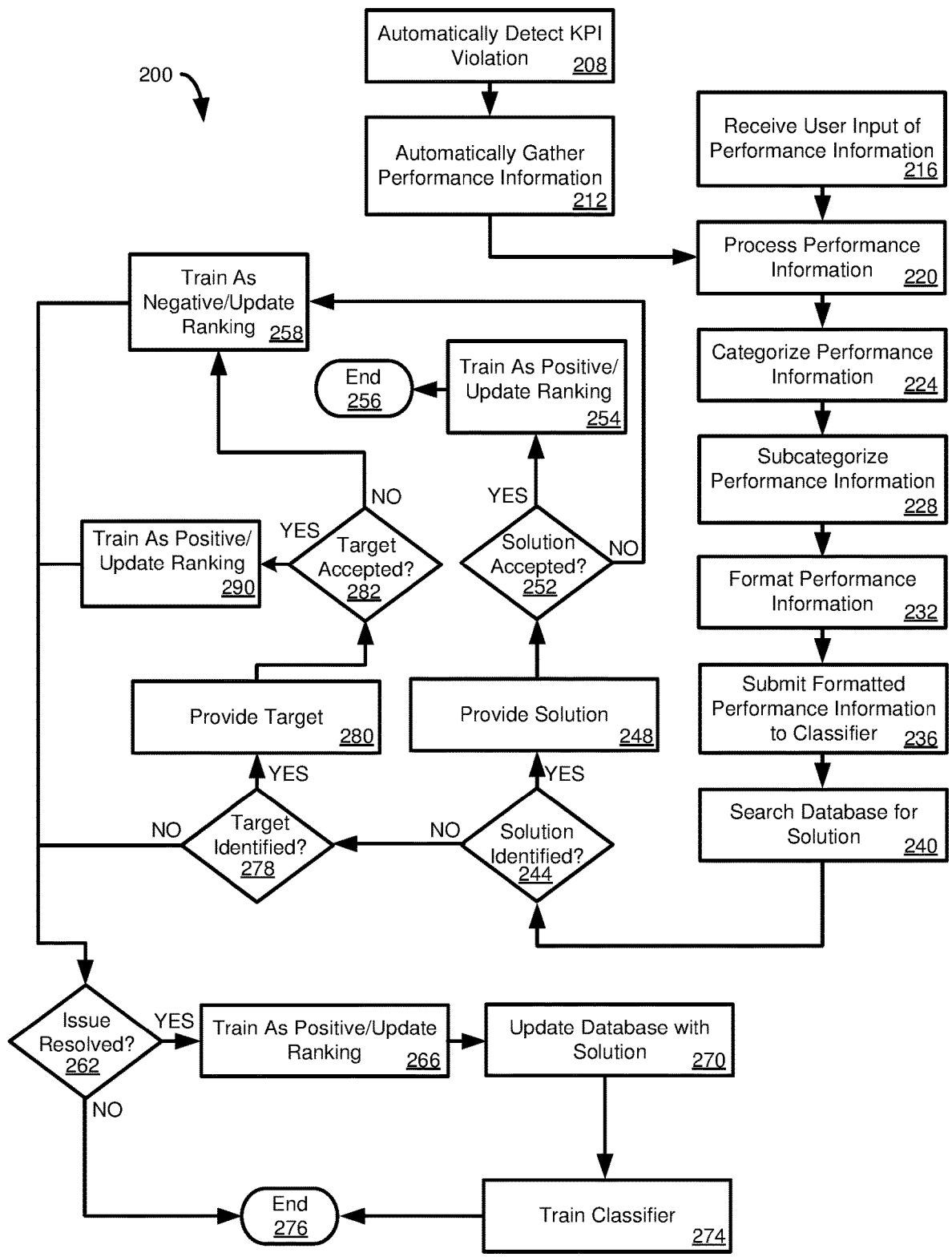
FIG. 2 is a flowchart of a method for submitting performance information to a classifier using a machine learning model to suggest a solution or target for a software bug or performance issue.

FIG. 2 presents a flowchart of a method 200 for analyzing and correcting performance issues or program bugs using one or more disclosed technologies. The method 200 can be carried out using various computing environments, including environments disclosed herein, such as the environment 100.

In some cases, the method 200 can begin by automatically detecting a violation of a key performance indicator (KPI) at 208. In some cases, a KPI can also be, or be associated with, one or more performance parameters of performance information. A KPI indicator can, for example, be a threshold execution time or threshold use of computing resources. For example, if execution of a database query, or rendering of a user interface screen, exceeds a threshold, a KPI violation may occur and be detected at 208. Instead of, or in addition to, a KPI, error detection or error handling routines may be used to automatically or manually trigger the processing of method 200, which can otherwise proceed as described for a KPI.

At 212, performance information, such as logs or traces, is automatically gathered. The performance information gathered at 212 can be tailored to a particular KPI violation or a software component associated with the KPI violation. For instance, a rule can be defined that indicates actions to be taken when the KPI violation occurs. The actions can include retrieving logs or generating traces.

In a particular example, KPI violations can be specified with respect to ranges, including ranges for particular application types, applications, or operations. For instance, for a user-interface action that is associated with "instant" feedback, a violation can occur if the response time (e.g., from the time the user requests an action to the time when the user interface provides the appropriate response) is greater than 150 milliseconds, and a "high" violation can occur if the response time is greater than 500 milliseconds. A KPI for "instant feedback" can also be specified with respect to a number of roundtrips (e.g., from a user interface component to an application component, a database component, or a plurality of components) that is greater than 0 for both violation and high violation (e.g., the user interface should handle the action without calling another component). For a "simple" action, a violation may be indicated if the response time is greater than 1,000 milliseconds, and a high violation may be indicated if the response time is greater than 3,000 milliseconds. A violation for "simple" actions can also be specified as more than 1 roundtrip occurring for a violation, with a high violation being indicated if more than 2 roundtrips occurred. For a "complex" action, a violation may be indicated if the response time is greater than 3,000 milliseconds, with a high violation occurring if the response time is greater than 5,000 milliseconds. In terms of roundtrips, a violation may be indicated for a complex action if more than two roundtrips occur, and a higher violation indicated if more than three roundtrips occur. A user can define KPI types and values for various types of actions, as desired.

The actions at 212 can also include running tests or taking other actions to reproduce a bug or performance issue. As an example, if a user interface element or screen is taking longer than a threshold time to render, 212 can include activating tracing functionality and then reloading the screen or user interface element, where the trace will capture information about computing operations occurring while the bug or performance issue is occurring.

Alternatively, the method 200 can begin at 216 by receiving a user request to analyze a bug or performance issue, where the request includes user input of performance information, such log or trace files to be analyzed. In other cases, the user can initiate an analysis request, but the performance information gathering, including optionally reproducing the bug or performance issue (or executing a test) can be carried out as in 212.

Whether initiated at 208 or 216, the method 200 can process performance information at 220. Processing performance information can include removing certain types of information from the performance information, such as information relating to components that are not modifiable or which are otherwise designated as not being candidates for corrective action. Processing at 220 can also include removing information that does not inform a possible source, or corrective action, for the bug or performance issue.

At 224, the processed performance information is categorized, such as at a first level. The categorization 224 can be automatic or manual based on user input. Automatic categorization 224 can be carried out using information such as a file extension of a log or trace file, metadata associated with the performance information, or the contents of the performance information. If desired, the categorized information can be subcategorized at 228. Subcategorization 228, in some cases, can be carried out in a similar manner as the categorization 224. In other aspects, subcategorization 228 can be carried out by semantically analyzing the performance information, such as using a machine learning algorithm. In a particular example, the semantic analysis is carried out using deep natural language processing.

The subcategorized performance information (or, in other cases, categorized information or even uncategorized information) is formatted at 232. Formatting can include modifying the performance information for use by a classifier based on a machine learning technique. For example, formatting can be used to convert the performance information to a common format, including by removing specific information (e.g., database table identifiers or database table field identifiers) from the performance information, and optionally substituting a generic term for the specific term (e.g., TABLE for a specific table identifier, FIELD for a specific field, ROW for a specific row, or COLUMN for a specific column) In other aspects the formatting 232 can be omitted.

At 236 the performance information (typically formatted) is submitted to a classifier based on a machine learning model. The formatting at 232 can include formatting the performance data for use with the classifier. For example, the classifier can use a word embeddings based technique, such as Continuous Bag of Words or Skip Gram techniques. Formatting at 232 can include forming suitable input word vectors.

After submission to the classifier, the classifier provides output. The output can be one or more code segments, operations, programs, or program components that may be associated with the performance issue or bug. The output can be used to search a database for a potential solution at 240. At 244 it is determined whether a solution has been identified. In some cases, more than one potential solution can exist. In such cases, the most likely solution can be returned, or a ranked list of possible solutions can be returned. If one or more solutions have been identified, they are provided, such as to a user through a user interface or in return to an API or RPC call, at 248.

At 252, it is determined whether the solution is accepted, such as in response to user input indicating whether the solution solved a performance issue or bug. If the solution is indicated as appropriate (e.g., solving the performance issue or bug), the ranking of the solution in the database, and optionally the classifier, can be updated accordingly (e.g., to rank the solution higher in future analyses or to provide a stronger correlation between the input and output in the classifier) at 254. The method 200 can then end at 256.

If the solution is not accepted, the ranking in the solution database, and optionally the classifier, can be updated at 258 to reflect that the solution was not accepted (e.g., providing a lower ranking of the solution in future analyses or weakening a correlation between the input and output for the classifier). At 262, it can be determined whether the performance issue or bug was resolved, such as by a user employing an alternative solution of the database (e.g., a lower ranked solution) or creating a new solution. If the issue was resolved, the database can be updated with the new solution, or the ranking altered for an alternative solution at 266. If the solution is a new solution, the database can be updated to include the solution at 270. Optionally, at 274, the classifier can be updated to reflect a positive correlation between the input and the output (e.g., the output was positively correlated with the input, even though the solution of the solution database was not positively correlated). The method 200 can then end at 276. If the issue was not resolved at 262, the method can end at 276.

If, at 244, a solution was not identified, it can be determined at 278 whether a target or "hotspot" was identified. If not, the method 200 can proceed to 262 and the method can continue as previously described. If a target was identified at 278, the target can be provided, such as through a user interface or as a value in response to an API or RPC call, at 280. The method 200 can determine at 282 whether the target was accepted, such as in response to user input. If the target was not accepted, the database can be updated at 258 to modify the ranking of the target and, optionally, the classifier updated to weaken a correlation between the input and output. If the target was accepted at 282, at 290, the method 200 can update the database to modify the ranking of the target and, optionally, the classifier update to strengthen a correlation between the input and output. After 258 or 290, the method 200 can proceed to 262 and can continue as previously described.

EXAMPLE 4

Example Training of Machine Learning Model

Figure 3:
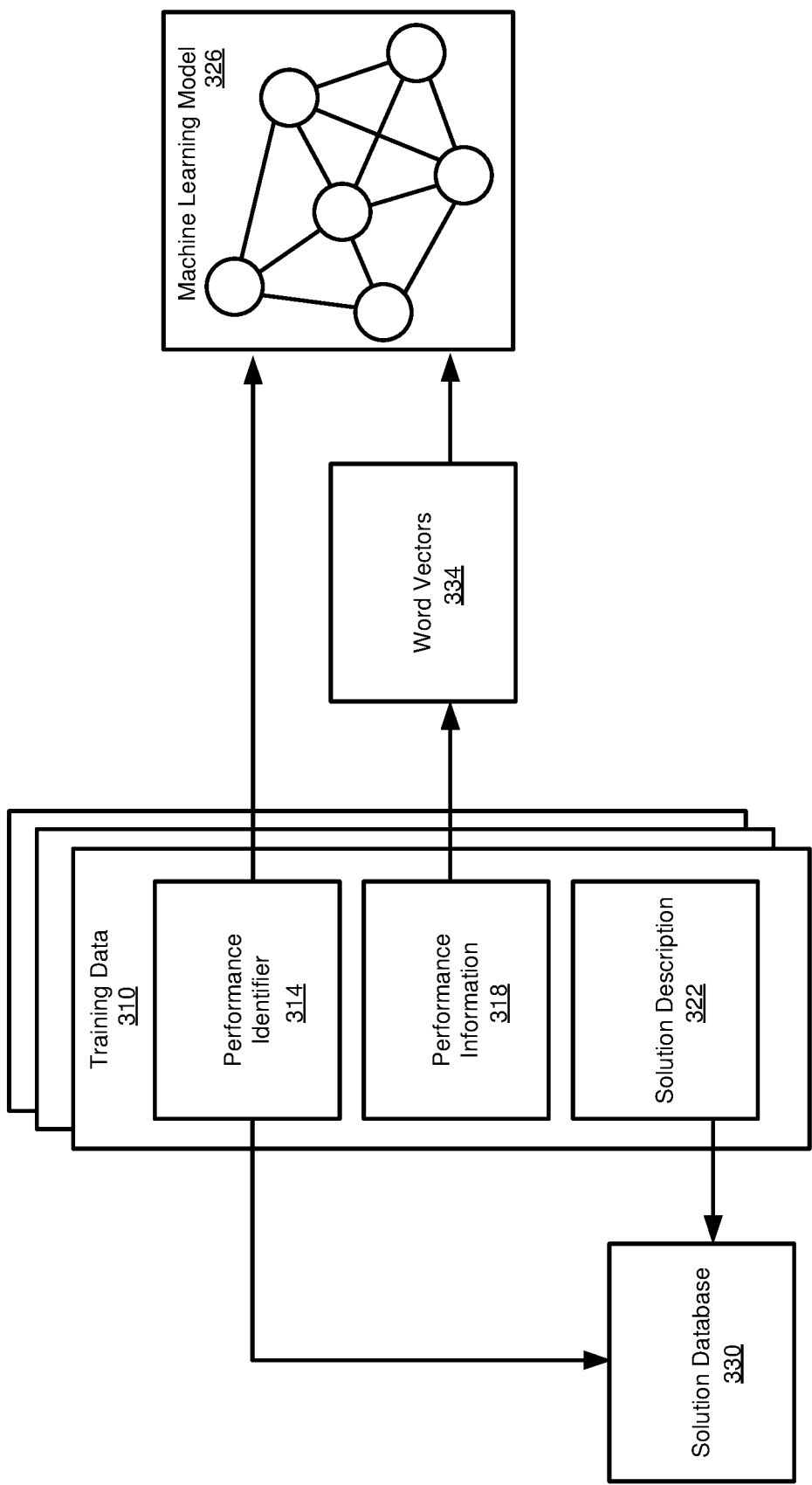
FIG. 3 is a diagram schematically depicting how training data can be used to train a machine learning model and populate a solutions database.

FIG. 3 is a diagram illustrating how training data 310 can be used to train a machine learning model to provide a classifier that can be used to automatically determine features associated with performance issues or bugs, and automatically suggest or provide a resolution. The training data 310 can represent a performance issue or bug, information useable to identify the performance issue or bug, and an identified solution to the performance issue or bug.

The training data 310 can include a performance identifier 314. The performance identifier 314 be, or include, a label that identifies a source of a performance issue or bug. For instance, the performance identifier 314 may be, or include, a problem description such as "data not formatted correctly," or "improper ordering of query terms." The performance identifier may be, or include, an identifier of one or more program components that may be responsible for a performance issue or bug, such as identifying particular code segments, particular methods, or particular data types, data structures, or other program features or processes.

The training data 310 can include performance information 318, such as log or trace information. The performance data can specify parameter values (e.g., execution time or resource use, such as CPU, memory, network, etc.) for particular operations, processes, or other components of program operation. The performance information 318 can be edited or formatted, such as to remove information that may not be relevant, to replace certain specific features with more generic features (e.g., removing references to particular tables or fields thereof), or to add metadata tags to performance information. The training data 310 can include a solution description 322, which can be a description of how to solve the performance issue represented by the training data 310, or can include an actual, implementable solution, such as replacement program files, program code, specifications of database operations, or the like.

The performance identifier 314 can represent the type of output that will be provided by a classifier formed from a machine learning model 326 after the model is trained (or the classifier receives additional training) The performance identifier 314 and the solution description 322 can be stored in association with one another in a solution database 330. In addition to, or instead of, a solution description (or solution), the performance identifier 314 can be stored in association with one or more targets or hotspots.

In some cases, a performance identifier 314 can be associated with multiple potential solution descriptions 322 or targets. When a solution description 322 (or target) is provided by the solution database 330, the solution description (or target) can be provided based on a ranking, such as a ranking based on a probability that the solution description will resolve the performance issue or bug (or that the target is associated with the performance issue or bug). In at least some cases, multiple solution descriptions 322 (or targets) can be provided in response to an analysis request, such as providing a ranked list.

The performance information 314 can be used to construct one or more word vectors 334 for use in the machine learning model 326. The word vectors 334 can be "one hot" vectors, where index positions in the array represent a vocabulary and the indicated word (or other token) is identified by setting a value for the word as a first value (e.g., '1') and setting other index values to a second, different value (e.g., '0'). The word vectors 334, or other input to the machine learning model 326, can include input other than "words." For example, at least one input can be, or can include, numerical values, including numerical values representing performance parameters (e.g., execution time, CPU use, memory use, network use, etc.).

The word vectors 334 (an optionally other input) and performance identifier 314 are used to train the machine learning model 326.

EXAMPLE 5

Example Use of Classifier

Figure 4:
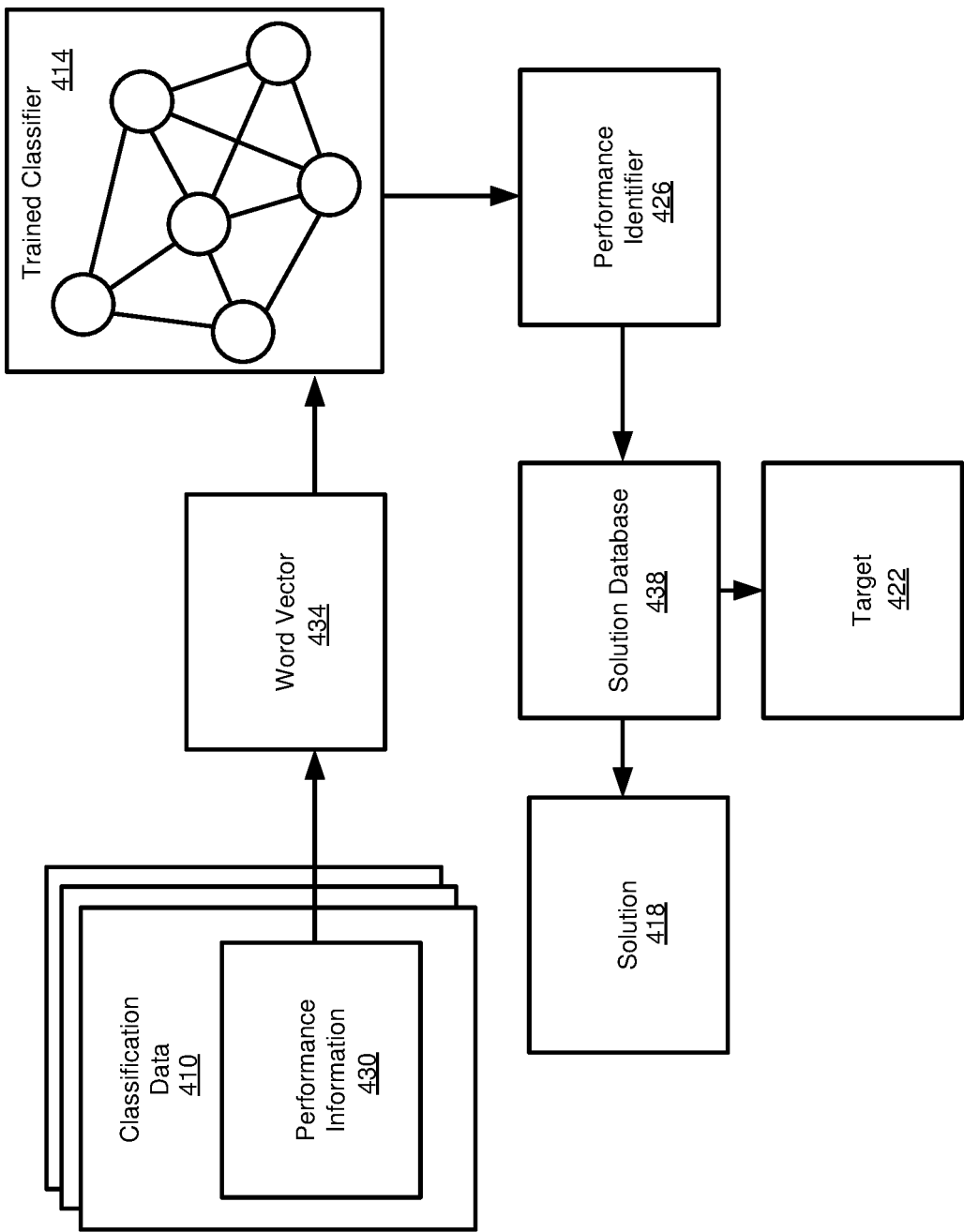
FIG. 4 is a diagram schematically depicting how classification data can be submitted to a classifier using a machine learning model to identify a particular solution or target for a performance issue.

FIG. 4 is a diagram illustrating how classification data 410 can be submitted to a trained classifier 414 to provide a suggested solution 418 or target 422 for a performance identifier 426 returned by the classifier. The classification data 410 can include performance information 430, such as log or trace information. The classification data 410 can be processed in a manner analogous to that described for the performance information 318 of FIG. 3. In at least some cases, the performance information 430 and the performance information 318 are processed in an identical manner The performance information 430 can be converted to word vectors 434, including in an analogous manner to that described for the performance information 318 and word vectors 334 of FIG. 3. As with the input to the machine learning model 326, the input to the classifier 414 can include information in addition to the word vectors 434, or the word vectors can include additional information (e.g., values for performance parameters).

The classifier 414 produces the performance identifier 426 as output. The performance identifier 426 can be submitted to a solutions database 438. The solutions database 438 can return the suggested solution 418 or target 422. The solution 418 or target 422 can be associated with a confidence value or returned as part of a ranked list. In some cases, the performance identifier 426 itself may serve as a target or hotspot, in which case additional information may not be returned from the solutions database 438 if a solution is not identified.

EXAMPLE 6

Example Computing Environment

Figure 5:
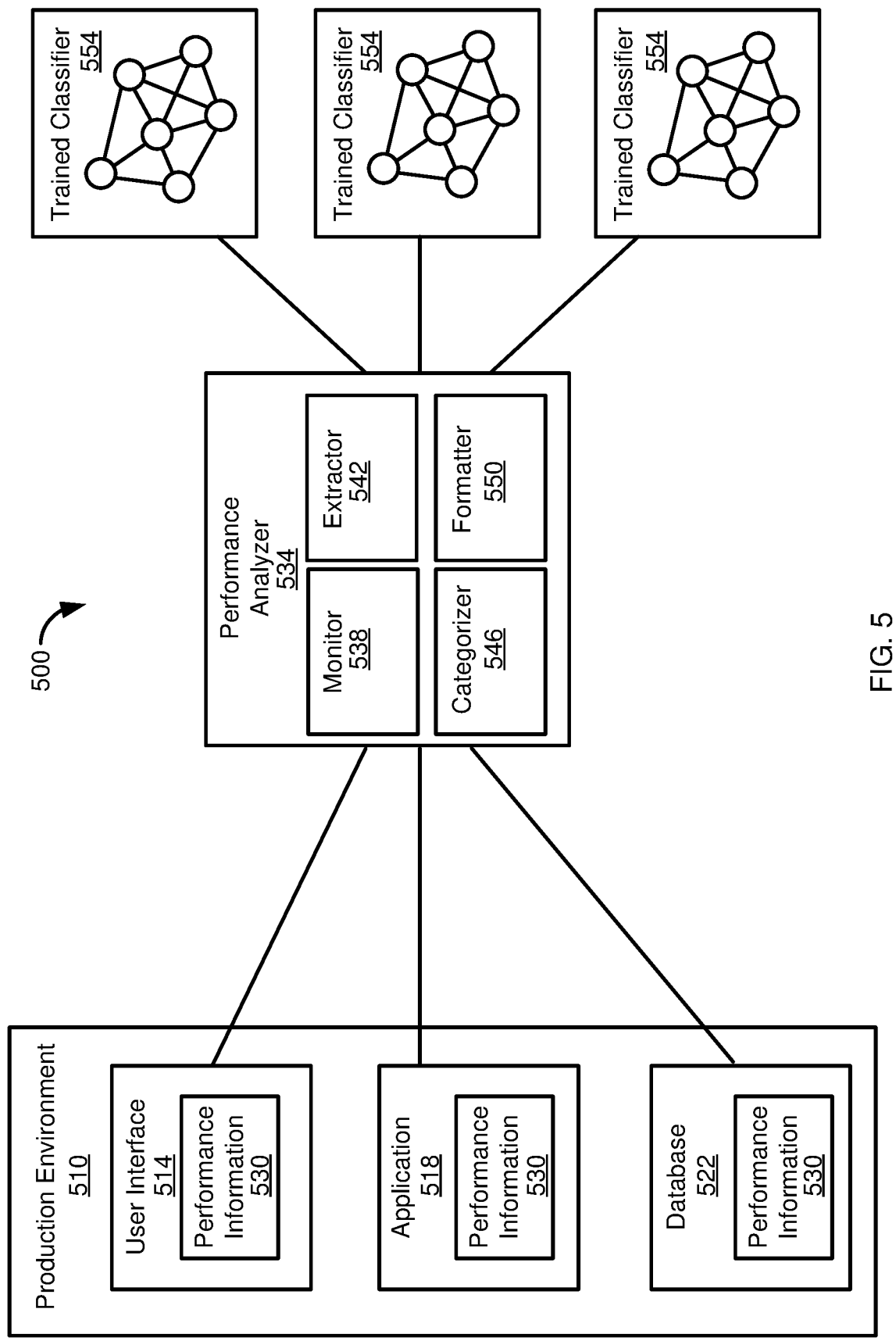
FIG. 5 is a block diagram illustrating a computing environment in which disclosed technologies can be implemented.

FIG. 5 is a diagram of a computing environment 500 in which disclosed technologies can be implemented. The computing environment 500 can include a production environment 510 which may be subject to performance issues or bugs, and can be monitored, including being automatically monitored. For example, components of the production environment 510 can be monitored for execution time and resource use, and an analysis can be triggered if one, a plurality, or a specified combination of measured values violate a specified threshold.

The production environment 510 can include one or more components that can be associated with performance issues or bugs. The components can include a user interface 514, an application 518, and a database 522. However, it should be appreciated that the components are representative only, and a production environment 510 can include more, fewer, or different components than shown.

Each of the components of the production environment 510 can be associated with performance information 530, such as logs or traces. In at least some cases, all or a portion of the performance information of components of the production environment 510 can be different. For example, a file type, data format, or data content may differ. In addition, names or metadata information of the performance information 530 can differ, and the procedure used to activate or obtain the performance information can be different for different components. The components of the production environment 510 may have other differences, such as being written in different programming languages, and being operationally or physically separate from another.

The components of the production environment 510 can be used at least partially independently from one another, at least in some aspects. For instance, the application 518 have some functionality that does not require the use of the database 522, the application may be useable with other databases, or may be used with additional user interfaces other than the user interface 514. Similarly, the database 522 can be configured to operate with applications other than the application 518, or the database can include its own applications.

The production environment 510 can be in communication with a performance analyzer 534. In some aspects, the performance analyzer 534 can be associated with multiple production environments. In further aspects, the performance analyzer 534 can be part of a production environment 510.

The performance analyzer 534 can include a monitor component 538. The monitor component 538 can monitor components of the production environment 510. In some cases, the monitor component 538 can generate an alert or start an analysis if a performance issue or bug is detected, such as if a KPI violation is detected or if an error handling routine is triggered. In at least some cases, analysis may be triggered if a sum of KPIs for different components exceeds a threshold, in which case performance information for the involved components can be further analyzed.

The monitor component 538 can also allow a user to view performance parameters, where a user can institute an analysis if desired. In some case, the monitor component 538 can be omitted. For example, other features of the performance analyzer 534 can be triggered by a user, or the production environment 510 can include a monitor component that triggers or calls functionality of the performance analyzer. The monitor component 538 can include stored operations for retrieving the performance information 530 if a rule violation is detected, or if a user request an analysis.

Although not shown, the performance analyzer 534 can include rule definitions that can include parameters to be monitored and values for determining whether a rule is violated. The performance analyzer 534 can include functionality for allowing a user to view, create, or modify such rules, such as providing a user interface or an API that can be called by a program or a user.

The performance analyzer 534 can include an extractor component 542. The extractor component 542 can be used to extract (or remove) information from performance information 530 provided from the production environment 510. For example, the extractor component 542 can include methods for removing unneeded data from performance information 530, such as data relating to software components that are not alterable by the user or in conjunction with the performance analyzer (e.g., library files or files provided by a third party) or data that is not informative as to the source of a performance issue or bug, or how such a performance issue or bug might be resolved.

The performance analyzer 534 can include a categorizer 546. The categorizer 546 can apply rules or analysis (for instance using semantic analysis, such as using deep natural language processing) to classify or categorize performance information 530 (which can be performance information having been extracted by the extractor component 542). The categorizer 546 can be used to categorize performance information 530, such as identifying the performance information as associated with the user interface 514, the application 518, or the database 522. The categorizer 546 may also categorize the performance information 530 in a subcategory, such as, for the database 522, whether the information is associated with a JOIN engine, an OLAP engine, a column engine, or a row engine.

In some aspects, the categorizer 546 can analyze the performance information 530, such as to determine components or subcomponents of an aspect of the production environment 510 that may be giving rise to a performance issue or bug. Accordingly, categorizing by the categorizer 546 can include determining that particular sources of performance information 530 do or do not give rise to a violation (e.g., an application is running slowly, but the problem is identified as occurring in the database 522 rather than the user interface 514 or the application 518). For particular sources of performance information 530 that may associated with a problem, the performance information can be subclassified as belonging to a particular component (e.g., function, code segment, operations) of the production environment 510. Further processing can be carried out based on the categorization or subcategorization applied by the categorizer 546.

The performance analyzer 534 can include a formatter 550. The formatter 550 can format performance information 530 for use to train a machine learning model to provide a classifier, to provide additional training for a classifier, or to be used by a classifier. The formatter 550 can select performance information 530 (including performance information processed by the extractor component 542) for further processing. For example, based on the categorization by the categorizer 546, some performance information may no longer be needed for an analysis.

The formatter 550 can also modify performance information 530, including by converting the performance information to a standard format, which can include removing some of the performance information or replacing some of the performance information, such as by abstracting certain details in the performance information. As an example, if performance information 530 involves SQL operations, identifiers for specific tables, columns, rows, fields, etc. can be replaced by a generic label (e.g., a specified row identifier is replaced with "ROW"). The formatter 550 can format performance information 530 for use by a classifier 554. For example, if a classifier 554 uses word vectors as input, the formatter 550 can convert the performance information 530 to one or more suitable word vectors.

In at least some cases, a performance analyzer 534 can access, or include, a plurality of classifiers 554, where a suitable classifier can be selected, for example, based on categorizations (or subcategorizations) applied by the categorizer 546. In such cases, a formatter 550 can apply different operations depending on the classifier 554 to be used. For instance, different classifiers 554 can include different vocabularies, which can affect how a word vector is constructed. Or, different classifiers 554 may use different supplemental input (e.g., numerical values), including not using supplemental input. The classifiers 554 can also be based on different machine learning models.

In some cases, the use of multiple classifiers 554 can provide more accurate results, or simplify data preparation (e.g., by the formatter 55). For instance, performance issues or bugs associated with the user interface 514 may not be relevant, or as relevant, to performance issues associated with the database 522. In other cases, the computing environment 500 can include a single classifier 554, where the classifier accounts for limited relevance between issues/solutions between different components of the production environment 510 (e.g., weightings of a hidden layer of a machine learning model will be lower for issues/solutions between different components than issues/solutions positively correlated with other particular components or subcomponents).

EXAMPLE 7

Example Sources of Performance Issues or Bugs

Figure 6:
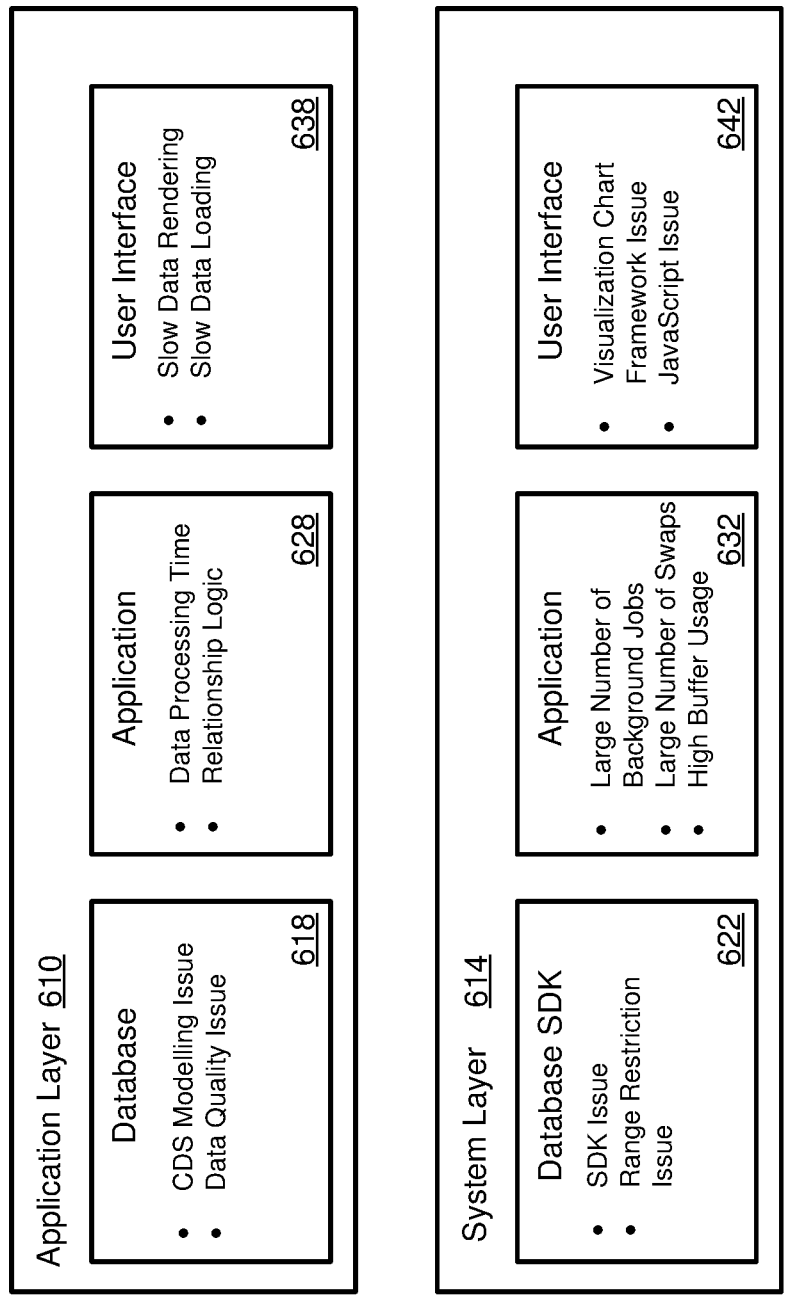
FIG. 6 is a diagram schematically depicting potential sources of performance issues or bugs that can be identified using performance information.

FIG. 6 illustrates how performance issues or bugs can relate to application or system layer programs or program components, and how different types of performance information can be used to identify programs or components that may be associated with a performance issue or bug. FIG. 6 can represent issues that may arise using products of SAP, SE, of Walldorf, Germany, including a database, such as the HANA database, an application server, such as an ABAP server, and a user interface component, such as the Fiori user interface.

Performance issues or bugs can be associated with an application layer 610 or a system layer 614. Performance information for application layer 610 database components 618 can be provided by all or a portion of a Performance Trace, such as a SQL Trace (ST05). The information in the performance information for the database components 618 provided by the Performance Trace can include, for individual SQL statements, how many times the statement executed, how many records were selected or changed, and statement execution time. Performance information for the database components 618 can also be provided by the PlanViz (ST05) report, which can provide information regarding a SQL execution plan, including tables used, a number of table entries processed by each SQL operator in the plan, and number of records input and output.

The performance information for the database components 618 can be used to identify issues such as improper modelling used with Core Data Services (e.g., of the HANA database system of SAP SE of Walldorf, Germany) For example, the performance information for the database components 618 can be used to indicate that application level logic is not being pushed down to the database layer (for example, application level logic that would restrict the amount of data to be processed at the database level). Or, the performance information for the database components 618 may indicate a problem with the quality of the source data.

In one scenario, a problem with the quality of the source data can be that the amount of source data is insufficient to provide a level of detail requested, such as in a Core Data services view. Database views can be categorized by size (e.g., small, medium, large, etc.), where a size category may include a minimum number of rows in order to meet the category definition. For example, a size category can be provided as an annotation (e.g., metadata) for a Core Data Services view. Performance issues can arise when the quantity of data is not sufficient to meet criteria defined for a database view. In the event a performance issues is identified, such as by available data being a threshold amount for a size category, such as an average size for the category (the average of the minimum and maximum number of rows, or other data units, for the category), a user can device whether to proceed using the limited dataset available in the database, supplying additional data to satisfy size criteria, or redefining the view to a different category size.

The SQL Trace, particularly if executed using the "extended" option, can also be used to identify system layer 614 database components 622. For example, the performance issues or bugs can be associated with issues in a secure development kit. System layer issues 614 in the database components 622 can also involve range restriction issues, such as whether SQL operations are executed against current information and at least a portion of historical data.

Performance information for application layer 610 application components 628, such as with or using an ABAP server, can be identified using the ABAP Runtime Analysis (transaction SAT) of SAP SE of Walldorf, Germany. The performance information for the application components 628 includes metrics for particular program parts (e.g., particular classes, programs, or function groups) and can be further specified by particular code blocks (e.g., methods, events, function modules), type of code (e.g., flow logic or message handling), and whether, and what types, of database access operations should be analyzed. The performance information can include execution time for particular operations of particular programs or program components.

Similarly, the STAD transaction of SAP SE of Walldorf, Germany, can provide information regarding execution of particular transactions or program "jobs", including statistical information regarding database processing involved with the transaction, the use of stored database procedures, RFC statistics, and information about the source of a job. The statistical information can include execution time, memory use, CPU use, number of database records processed, and amount of information returned to a source of a transaction or job. The performance information of the application components can be used to analyze issues related to data processing time and potential errors in how various logical data objects (e.g., instances of abstract data types) are processed.

At the system layer 614, application components 632 can be investigated using performance information provided by the SM50 transaction and the ST02 transaction. The SM50 transaction can provide information about executed applications, including the status (running, aborted), error messages, cumulative CPU use, and elapsed running time. The ST02 transaction can provide information regarding buffer and memory configuration and use, including buffer use, number of buffered objects swapped to page area, data transferred from a database to a particular buffer, and amounts of memory allocated and used. The performance information for application components 632 can be used to identify problems arising from having too many background jobs, a high number of swaps between a buffer and a page area, and low buffer utilization.

Performance information, such as a HTTP trace, can be used to identify issues with user interface component 638 at the application layer 610 and user interface components 642 at the system layer 614. For example, the components 638 can be associated with slow data rendering or slow graph rendering, while the components 642 can be associated with issues in a framework that provides data visualizations or issues with JavaScript code.

Relationships between performance information and program components, including whether the programs are at an application layer 610 or a system layer 614 can be used to categorize a performance issue or bug for further analysis. For example, performance information for a number of application layer 610 components, system layer 614 components, or a combination thereof can be obtained and analyzed. Metrics can be used to determine which components are likely involved in the performance issue or bug, such as parameters of performance issues where performance is at a value that violates a threshold. Depending on which components are implicated, certain performance information can be excluded from subsequent analysis, used to determine a classifier to be used, and used to determine how data should be formatted for use with the classifier.

EXAMPLE 8

Example Identification and Correction of SQL Issue

This Example 8 illustrates how disclosed technologies can be used to identify and resolve performance issues or bugs. For instance, FIG. 7 illustrates an example SQL statement 710. The SQL statement 710 is identified as having a performance issue, such as exceeding a set threshold execution time. In response to manually or automatically detecting that the threshold has been exceeded, performance information can be automatically or manually captured.

FIG. 8 illustrates performance information 800 associated with query execution of the SQL statement 710. In particular, the performance information 800 lists operators 810 associated with a JOIN engine used in the query. For each operator 810, the performance information includes execution time 814, CPU time 818, tables processed 822 with the operator, a number of input rows 828, and a number of output rows 832.

In a particular aspect, the execution times 814 can be compared with a threshold. In this example, the operator 836, JERequestedAttributes is identified as taking 316 milliseconds, which is determined as exceeding the threshold.

Determining that the operator 836 exceeds the threshold can be used for a number of purposes. The performance issue or bug can be classified as involving the database, and the JOIN engine in particular. This classification can be used to select performance information (e.g., particular data or data sources) for further analysis, a classifier to be used, and how data should be formatted for use with the classifier. For instance, the performance information 800 can be used to identify the performance issue as involving the JOIN engine, and using a classifier for the JOIN engine.

The operator 836 is associated with operations 720 of FIG. 1. The operations 720 can be initially be formatted for use with a classifier using the format (OPERATOR NAME, EXECUTION TIME, GROUP NUMBER, TABLES PROCESSED, MAX ROWS, FILTER PROCESSED). With the operations 720, the initially formatted performance data can be expressed as formatted data 730. The group number can be determined by segmenting input rows and output rows by groups based on row number. For instance, for a scenario with 300 input rows and 300 output rows, the input and output rows can be distributed in groups of 100. Input rows can be represented as $X_1$ (rows 1-100), $X_2$ (rows 101-200), and $X_3$ (rows 201-300). Similarly, output rows can be represented as $Y_1$ (rows 1-100), $Y_2$ (rows 101-200), and $Y_3$ (rows 201-300).

Groups can be formed by combining permutated selections (i.e., Cartesian product) of input and output rows, such as having Group 1 of $X_1,Y_1$, Group 2 of $X_1, Y_2$, Group 3 of $X_1, Y_3$, Group 4 of $X_2, Y_1$, etc. So, in the case of an operator associated with 298 input rows and 10 output rows, the operator would be assigned to Group 7 ($X_3,Y_1$). The maximum number of rows would be the largest of 298 and 10, or 298.

In particular cases, the groups of input and output rows can be used to identify performance issues. For example, a JOIN operation can be predicted to use a particular number of input rows and produce a particular number of output rows. If more input rows or output rows are present than would be predicted, a performance error can be detected, which can be associated, for example, with incorrect processing. Solutions can include filtering data, applying operators to data, or clustering data. Thus, grouping by input/output rows can provide insights as to the source of a performance issue, and potential solutions.

At least in some cases, at least a portion of the formatted data 730 can be replaced with abstracted information. For example, the particular tables processed by a statement may not been particularly informative as to the source of a performance issue or bug, and may obscure a comparison with similar performance issues that happen to involve different tables. Accordingly, formatted data 740 has table and field names replaced with generic identifiers (e.g., "Table", "Field," "FieldA").

The formatted data 740 can be converted into a suitable word vector. For example, each element of the tuple can be converted into a word vector (e.g., a one-hot vector corresponding to the word), and the collection of vectors can be used as input for a classifier. In some cases, not every element of the formatted data 740 is converted to a word vector. For example, the EXECUTION TIME element can be left as a numerical (e.g., integer) value. Or the word vectors may be formed in another manner. For example, rather than one-hot word vectors, the word vectors can include an ordered sequence of attribute values according to a sequence of attributes defined for a "word". For example, word vectors can be constructed using values for each attribute of (OPERATOR NAME, EXECUTION TIME, GROUP NUMBER, TABLES PROCESSED, MAX ROWS, FILTER PROCESSED). Thus, the formatted data itself can serve as a word vector.

Word vectors can be constructed differently, including using different attributes, depending on a particular component being analyzed, or a particular report providing performance information. For example, in analyzing application or user interface components, rather than "input rows" and "output rows," other features can be used in word vectors. As an example, application logs (including, in products of SAP SE of Walldorf, Germany, the ST12 or SAT traces, or the example information of FIG. 9) can provide attributes such as net and gross execution time. For a statement, "net time" can identify how much time was taken to execute the statement, and how many times the statement was executed. Statements of the report can include programmatic keywords (e.g., keywords in the ABAP programming language), such as LOOP.

As a more particular example, consider a statement including a LOOP keyword that executed 5000 times and took 5 seconds to complete. A cluster for the application, application log (i.e., particular performance information), the LOOP operator, or including the LOOP operator can be used to identify that this particular statement is causing a performance issue or bug. In some cases, a classifier can be used to return information (e.g., contexts words or a particular target word) that can be submitted to a solutions database to identify a potential target or solution for the problem (or, the output of the classifier can itself be a target). Or, the classifier can position the performance information within the cluster, and the position in the cluster can be used to identify a potential target or solution.

As another example, consider performance information indicating that a particular READ statement was called (and executed) by multiple program modules. The performance information submitted to the classifier can indicate which function modules are invoking the READ statement and how many time the READ statement was invoked. The performance information, such as in the form of a word vector (e.g., a word vector of particular attributes of the performance information) can be submitted to a classifier for a cluster for, or including, the READ statement or operation (e.g., for READ statements, generally). The classifier may return particular modules that are associated with a performance issue or bug, including a number of times the read statement is invoked by the function module. A solution can include features such as caching, for example in a temporary table, the values from a first READ statement, which is then used to provide results to subsequent invocations of the READ statement.

As can be seen, the attributes used in a word vector (or clustering technique) can be tailored to particular performance information and particular clusters. In additional examples, database performance can be measured using attributes such as operation (or call), number of times an operation was executed, execution time (net per operation or gross for an overall process, or gross for an operation executed multiple times), number of records selected, total duration, server identifier, length, table type, table name, source of an operation (e.g., program or function module), type (e.g., ABAP, SQL, system operation), indications (or a number) of identical operations (e.g., table READ operations), number of records accessed or returned, buffer type (or, buffered or not buffered), an object name (e.g., a table, pool, cluster, or view name), or SQL statement or portion thereof.

For user interface layer performance information, clusters can be associated with document object model, cascading style sheet, or JavaScript issues. The clusters can be further divided into subclusters, such as having cascading style sheet issues be further divided into clusters for rendering issues or property manipulation issues. Keywords of these user interface categories can be used to identify the clusters. Attributes can include operation type, program module, and execution time. In the example of application layer issues, subclusters can be based on programmatic keywords, such as keywords in the ABAP programming language. Attributes can include various attributes mentioned above.

In at least some cases, including when application and user interface performance issues or bugs are analyzed, the classifier step (or, at least a classifier step that includes word vectors) can be omitted. That is, the performance information can be analyzed and assigned to a cluster, and the cluster can be used to identify particular solutions or targets. As an example, clusters can be associated with user defined functions. If the performance information includes calls to a user defined function (where an end user supplies actual code to be executed when the function is called), then a cluster for user defined function can be indicated.

Clustering algorithms, such as implemented using a clustering engine, can be used to further position performance information within a cluster. For example, a clustering algorithm can consider one or more, typically a plurality, attributes of the performance information. The position of attributes of the performance information, including for particular statements or elements of the performance information, within the cluster can be used to identify particular targets or potential solutions in a manner than can be otherwise similar to when a classifier is used. A clustering engine can use techniques such as connectivity models, centroid models, distribution models, density models, subspace models, group models, or graph-based models. Or, a neural model, such as a trainer classifier, can be used (e.g., a machine learning based clustering technique), but the classifier may be based on a technique other than Continuous Bag of Words or-Skip Gram. In such cases, the input to the clustering engine can be a word vector or collection of attributes as discussed above, or can be another type of input. The clustering engine can apply hard clustering or soft clustering.

In particular cases, a collection of word vectors for a particular cluster, such as an operational cluster, can be submitted as context words in a Skip-Gram technique. For example, operators associated with a JOIN engine can be a cluster, while operators for a row engine, a column engine, and an OLAP engine can form other clusters. In further cases, clusters may be determined in another manner Typically, clusters are defined, or context words otherwise selected, based on an expected or actual functional relationship between operators.

In particular implementations of a Continuous Bag of Words technique, each operator can be used to form a word as described above. The word can be submitted to a classifier that can return context words that are in a similar format. The context words can provide insights into the source of a performance issue or bug. The context words can be cross referenced to a solutions database that may include potential solutions, or target areas, to address the performance issue or bug.

The classifier can return an output that identifies one or more performance indicators, or other output (according to the training of the classifier) that can be associated with a performance issue or bug. In this case, the output can be used to determine that the CASE statement in the SQL statement 710 is resulting in the filter push down (e.g., of the operations to the database layer) not occurring. FIG. 7 illustrates the identified solution 750. The solution 750 is a suggested, generic correction of the FILTER PROCESSED element of the tuple of formatted data 740. A developer can implement the solution to provide the modified SQL statement 760.

The developer can identify the solution 750 as correct, which can result in additional training of the classifier, and can be used to update the ranking of the solution in the database.

EXAMPLE 9

Example Application Performance Information

Figure 9:
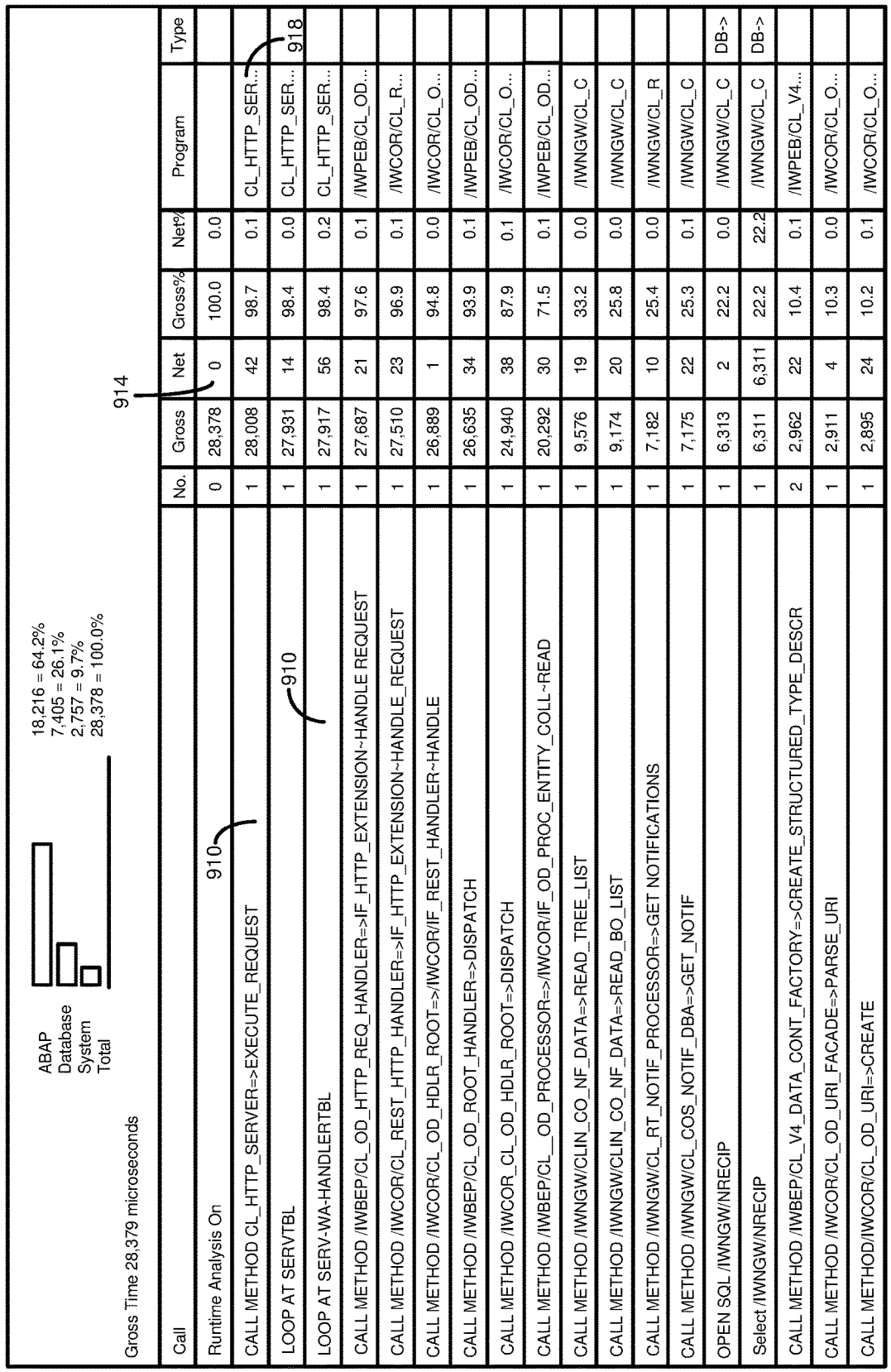
FIG. 9 is an example application screen providing performance information that can be used to identify errors associated with execution of particular programs or program components.

FIG. 9 illustrates performance information 900 that can be obtained from an application trace. The performance information 900 includes particular program operations (e.g., method calls, database operations) 910, net execution time 914, and an identifier 918 of a program associated with a program operation. The performance information 900 can be analyzed to determine program operations exceeding a threshold net execution time 914. Any program operations exceeding the threshold can then be formatted and submitted to a classifier, including generally as described for the performance information 710.

EXAMPLE 10

Example Operations for Use in Classifying Performance Information or Sources of Performance Issues or Bugs FIG. 10 illustrates a table 1000 of various logical operators 1010 and their corresponding physical operators 1016, an identifier 1020 of a database engine that applies the operator 1010, and identifiers 1024 of any related plan operators (POPs). The logical operators 1010, physical operators 1016, engine identifiers 1020, and POP identifiers 1024 can be used to subcategorize performance information prior to submitting performance information for training a machine learning model or to a classifier for analysis. For example, different classifiers may be used for different database engines. The logical operators 1010, physical operators 1016, engine identifiers 1020, and POP identifiers 1024 can also be used as labels or tags for potential targets (e.g., classifier output), such as to identify whether a performance issue or bug is associated with a particular physical operator or POP identifier.

EXAMPLE 11

Example Vocabulary and Word Vectors

Figure 11:
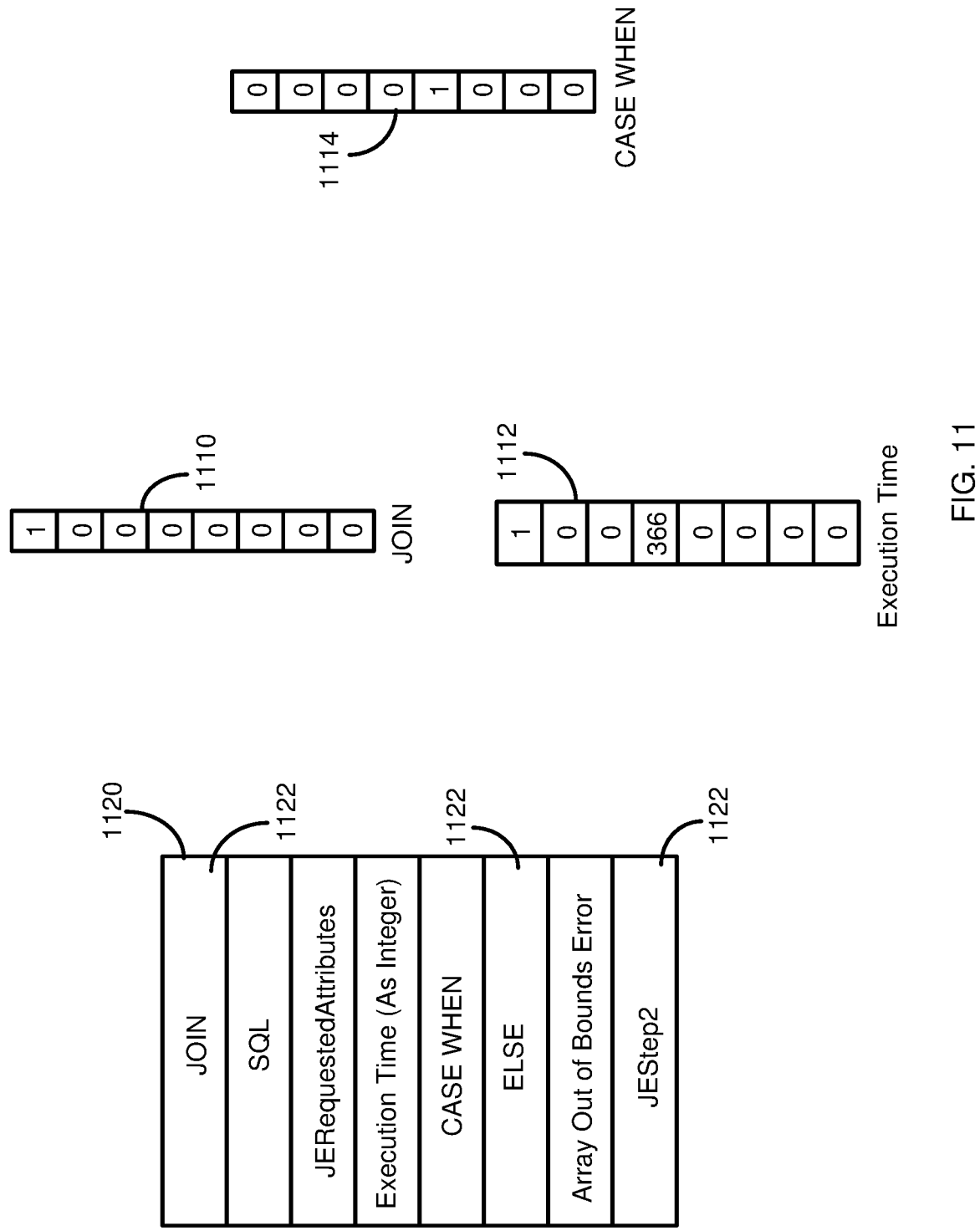
FIG. 11 is diagram schematically depicting how a vocabulary, in the form of an array, can be used to construct word vectors, representing a particular word in the vocabulary, or a value associated with a word in the vocabulary.

FIG. 11 illustrates how one-hot word vectors 1110, 1112, 1114 can be formed from a vocabulary 1120. The illustrated vocabulary 1120 has 8 "words," each of which can be indicated by an index position 1122 in an array. So, for example, in the vocabulary 1120, the word "JOIN" is represented by index 0, "SQL" by index 1, etc. The word "JOIN" can then be specified using the vector 1110, where index 0, corresponding to the array index associated with that word, is set to "1" and all other values are set to "0." Similarly, the "word" "CASE WHEN," having an index of 4 in the vocabulary 1120, can be represented by the vector 1112, where index 4 has a value of "1" and all other values are set to "0." At least in some cases, some positions of the vocabulary are not associated with a word, but with another value. For example, index position 3 of the vocabulary 1120 can represent execution time, where a numerical value is entered when the "execution time" is to be specified. For instance, vector 1114 includes a value of "366" indicating, for example, a 366 millisecond execution, in index position 3, with other values in the array set to "0."

EXAMPLE 12

Example Word Vectors for Continuous Bag of Words Technique

Figure 12:
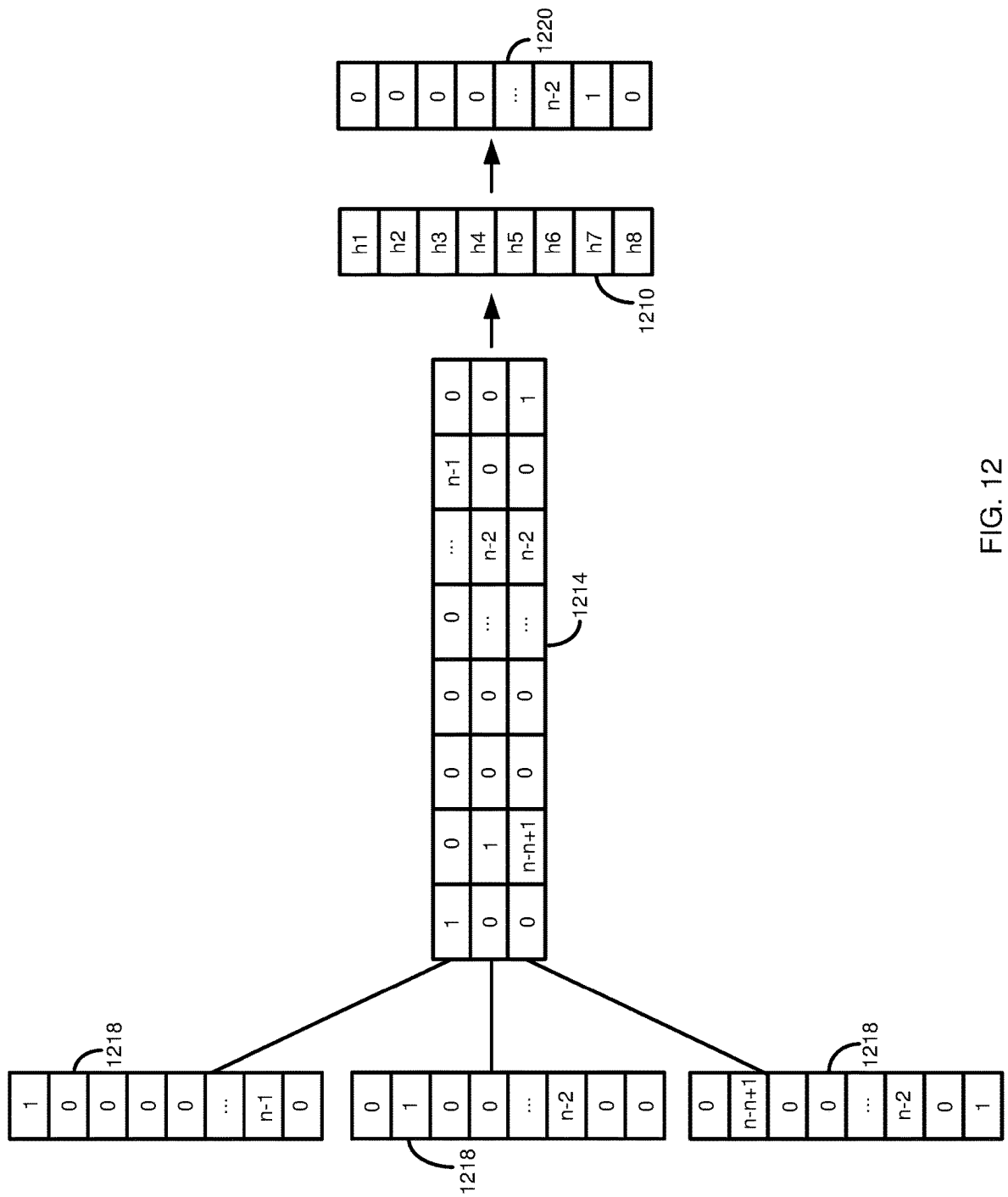
FIG. 12 is diagram schematically depicting how word vectors can be used as input to a classifier using a Continuous Bag of Words machine learning technique.

FIG. 12 illustrates how a plurality of one-hot word vectors, such as described with respect to FIG. 11, can be used in the Continuous Bag of Words machine learning model. The input to a hidden layer 1210 of a machine learning model (e.g., using the Continuous Bag of Words technique) is a N×V matrix 1214, where N is the number of context words and V is the number of words in the vocabulary. The matrix 1214 is formed from N context words, represented by one-hot word vectors 1218, each having V elements.

The matrix 1214 can be averaged by the number of context words and applied to the hidden layer 1210. The hidden layer produces a single output word vector 1220.

According to an aspect of the present disclosure, the one-hot word vectors 1218 provide the context for an error indicated by the output word vector. Although FIG. 12 illustrates a plurality of context word vectors 1218, in some aspects a single context word vector can be used. When a machine learning model is being trained, error between a predicted result (e.g., output word vector 1220) and the correct result can be backpropagated to adjust weights in the hidden layer 1210 and improve the accuracy of the model.

EXAMPLE 13

Example Word Vector for Skip Gram Technique

Figure 13:
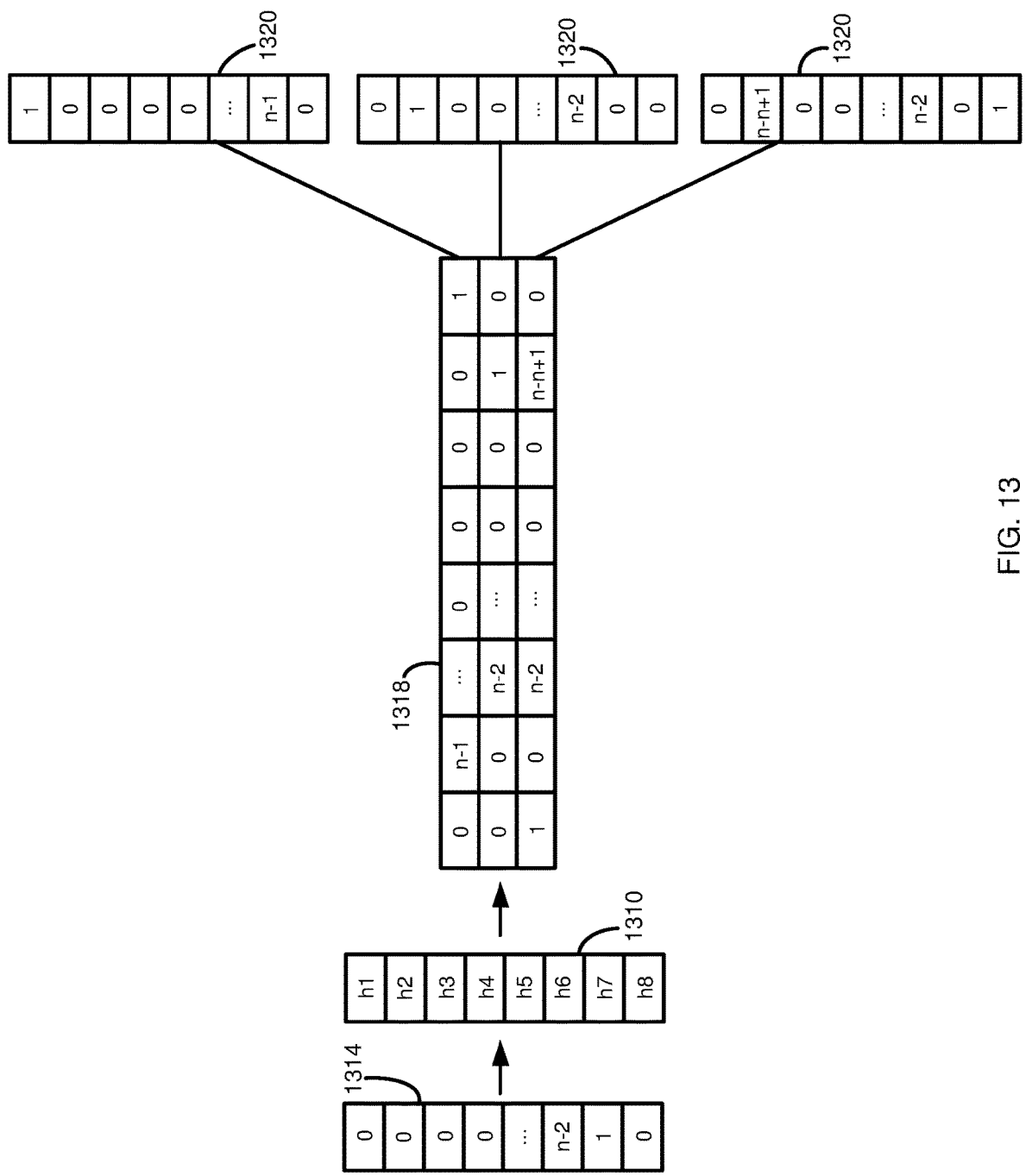
FIG. 13 is a diagram schematically depicting how a word vector can be used as input to a classifier using a Skip-Gram machine learning technique.

FIG. 13 illustrates how a plurality of one-hot word vectors, such as described with respect to FIG. 11, can be used in the Skip-Gram model. The input to a hidden layer 1310 of a machine learning model (e.g., using the Skip-Gram technique) is an array 1314 having V elements, where V is the number of words in a vocabulary. The array 1314 is applied to the hidden layer to provide a matrix 1318 corresponding to C context words, which can be represented as C word vectors 1320, where C is a number of context words specified during training.

According to an aspect of the present disclosure, the context vectors 1320 provide the context for an error indicated by the output word vector. Although FIG. 13 illustrates a plurality of context word vectors 1320, in some aspects a single context word vector can be used. When a machine learning model is being trained, error between a predicted result (e.g., context vectors 1320) and the correct result can be backpropagated to adjust weights in the hidden layer 1310 and improve the accuracy of the model.

EXAMPLE 14

Example Methods of Training and Using Classifier

FIG. 14A is a flowchart of an example method 1400 of obtaining classification results, such as in the form of a performance indicator that may be associated with a solution or target for correcting a performance issue or bug. The method 1400 can be carried out using the computing environment 100 of FIG. 1 or the computing environment 500 of FIG. 5. At 1404, performance information is received. The performance information is associated with the performance issue or bug and with software execution during the occurrence of the performance issue or bug. The performance information includes at least one performance parameter (e.g., execution time or resource use) and at least one software feature (e.g., program, program component, program operation or process, etc.) associated with the at least one performance parameter.

At least a portion of the performance information, including the at least one software feature, is formatted at 1408 for submission to a classifier using a machine learning model. At 1412, the formatted performance information is provided to the classifier. A classification result is received at 1416. At 1420, it is determined if a solution is associated with the classification result, such as by querying a database. Based on the determining, at 1424, at least one identified solution, or an indication that a solution was not identified, is returned.

FIG. 14B is a flowchart of an example method 1428 of automatically analyzing performance information. The method 1428 can be carried out using the computing environment 100 of FIG. 1 or the computing environment 500 of FIG. 5.

At 1432, at least one software performance metric is monitored. It is determined at 1436 whether at least one metric violates a threshold. Performance information, including at least one performance parameter, is caused to be gathered at 1440. At 1444, a type associated with the performance information is determined. An extraction rule associated with the type is received at 1448. At 1452, at least one performance parameter is extracted from the performance information using the extraction rule. Performance information that includes the performance parameter is formatted at 1456. The formatted performance information is provided to a classifier or a clustering engine at 1460. In some cases, the classifier can carry out clustering, or the clustering engine can use machine learning techniques. At 1464, a classification or clustering result is received. A solutions database is queried for a solution using the classification or clustering result at 1468. At 1472, at least on identified solution or an indication that a solution was not identified is returned.

Figure 14C:
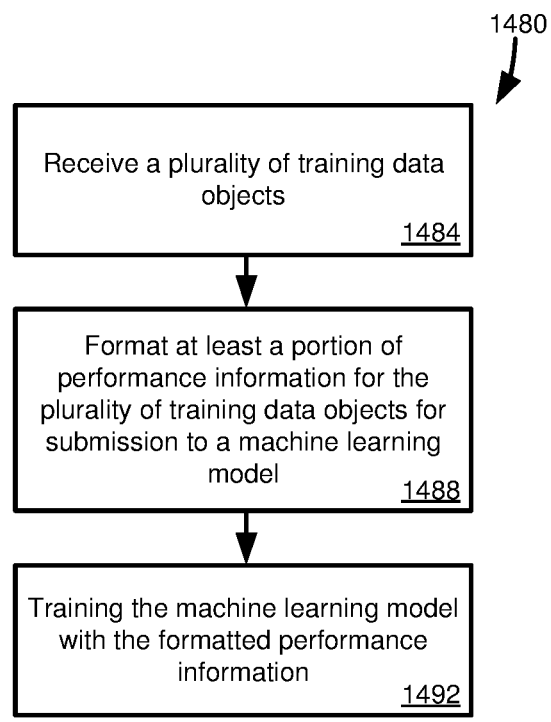
FIG. 14C is a flowchart illustrating operations in a method of training a classifier using training objects that include performance information.

FIG. 14C is a flowchart of an example method 1480 of training a classifier based on a machine learning algorithm. The method 1480 can be carried out using the computing environment 100 of FIG. 1 or the computing environment 500 of FIG. 5.

At 1484, a plurality of training data objects are received. The plurality of training data objects include performance information associated with software associated with a performance issue or bug and with software execution during the occurrence of the performance issue or bug. The performance information includes at least one performance parameter and at least one software feature associated with the at least one performance parameter. The training data objects include at least one performance indicator, which is associated with a solution to the performance issue or bug. The training data objects further include a solution to the performance issue or bug.

For the plurality of training data objects, at least a portion of the performance information is formatted at 1488 for submission to a machine learning algorithm. At 1492, a machine learning model is trained with the formatted performance information to provide a trained classifier. The trained classifier outputs a performance indicator in response to an input test data object. The input test data object includes performance information. The output performance indicator can be submitted to a solutions database to provide a suggested solution or an indication that a solution was not identified.

EXAMPLE 15

Computing Systems

Figure 15:
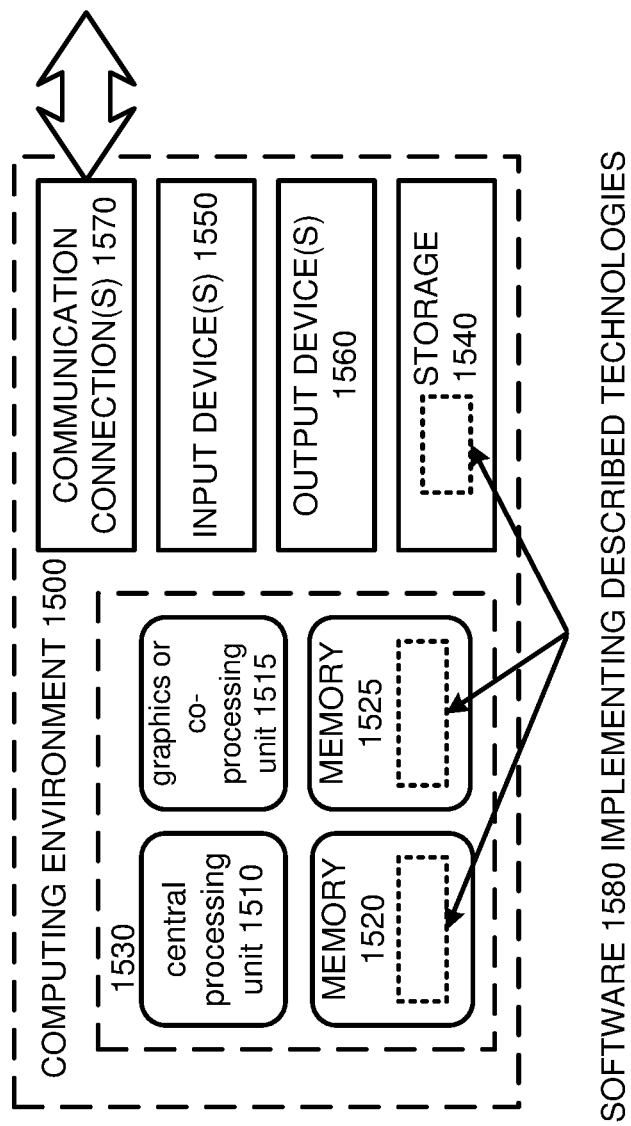
FIG. 15 is a diagram of an example computing system in which some described embodiments can be implemented.

FIG. 15 depicts a generalized example of a suitable computing system 1500 in which the described innovations may be implemented. The computing system 1500 is not intended to suggest any limitation as to scope of use or functionality of the present disclosure, as the innovations may be implemented in diverse general-purpose or special-purpose computing systems.

With reference to FIG. 15, the computing system 1500 includes one or more processing units 1510, 1515 and memory 1520, 1525. In FIG. 15, this basic configuration 1530 is included within a dashed line. The processing units 1510, 1515 execute computer-executable instructions, such as for implementing components of the computing environment 100 of FIG. 1 or the computing environment 500 of FIG. 5. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), non-volatile memory (e.g., ROM, EEPROM, flash memory, etc.), or some combination of the two, accessible by the processing unit(s) 1510, 1515. The memory 1520, 1525 stores software 1580 implementing one or more innovations described herein, in the form of computer-executable instructions suitable for execution by the processing unit(s) 1510, 1515.

A computing system 1500 may have additional features. For example, the computing system 1500 includes storage 1540, one or more input devices 1550, one or more output devices 1560, and one or more communication connections 1570. An interconnection mechanism (not shown) such as a bus, controller, or network interconnects the components of the computing system 1500. Typically, operating system software (not shown) provides an operating environment for other software executing in the computing system 1500, and coordinates activities of the components of the computing system 1500.

The tangible storage 1540 may be removable or non-removable, and includes magnetic disks, magnetic tapes or cassettes, CD-ROMs, DVDs, or any other medium which can be used to store information in a non-transitory way and which can be accessed within the computing system 1500. The storage 1540 stores instructions for the software 1580 implementing one or more innovations described herein.

The input device(s) 1550 may be a touch input device such as a keyboard, mouse, pen, or trackball, a voice input device, a scanning device, or another device that provides input to the computing system 1500. The output device(s) 1560 may be a display, printer, speaker, CD-writer, or another device that provides output from the computing system 1500.

The communication connection(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

EXAMPLE 16

Cloud Computing Environment

Figure 16:
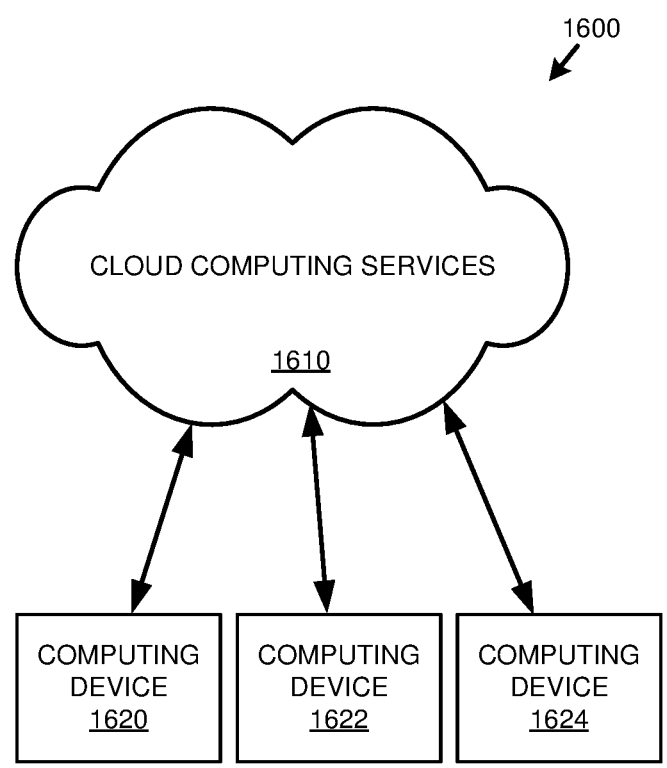
FIG. 16 is an example cloud computing environment that can be used in conjunction with the technologies described herein.

FIG. 16 depicts an example cloud computing environment 1600 in which the described technologies can be implemented. The cloud computing environment 1600 comprises cloud computing services 1610. The cloud computing services 1610 can comprise various types of cloud computing resources, such as computer servers, data storage repositories, networking resources, etc. The cloud computing services 1610 can be centrally located (e.g., provided by a data center of a business or organization) or distributed (e.g., provided by various computing resources located at different locations, such as different data centers and/or located in different cities or countries). The cloud computing services 1610 are utilized by various types of computing devices (e.g., client computing devices), such as computing devices 1620, 1622, and 1624. For example, the computing devices (e.g., 1620, 1622, and 1624) can be computers (e.g., desktop or laptop computers), mobile devices (e.g., tablet computers or smart phones), or other types of computing devices. For example, the computing devices (e.g., 1620, 1622, and 1624) can utilize the cloud computing services 1610 to perform computing operators (e.g., data processing, data storage, and the like).

EXAMPLE 17

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 15, computer-readable storage media include memory 1520 and 1525, and storage 1540. The term computer-readable storage media does not include signals and carrier waves. In addition, the term computer-readable storage media does not include communication connections (e.g., 1570).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more non-transitory computer-readable storage media storing computer-executable instructions for causing a computing system to perform processing to analyze a software performance issue or bug, the processing comprising:
    receiving performance information associated with software associated with the performance issue or bug and associated with software execution during the occurrence of the performance issue or bug, the performance information comprising at least one performance parameter and at least one software feature associated with the at least one performance parameter;
    formatting at least a portion of the performance information, comprising the at least one software feature, for submission to a classifier using a machine learning model;
    providing the formatted performance information to the classifier;
    receiving a classification result for the formatted performance information;
    determining if a solution is associated with the classification result; and
    based on the determining, returning at least one identified solution or an indication that a solution was not identified.

2. The one or more non-transitory computer-readable storage media of claim 1, the processing further comprising:
    determining at least one type associated with the performance information;
    retrieving an extraction rule for the determined at least on type; and
    according to the extraction rule, removing at least a portion of the performance information prior to providing the formatted performance information to the classifier.

3. The one or more non-transitory computer-readable storage media of claim 2, wherein the extraction rule specifies at least one performance criterion to determine whether performance information should be removed.

4. The one or more non-transitory computer-readable storage media of claim 1, wherein the formatting comprises instantiating one or more word vectors comprising at least some of the at least a portion of the performance information.

5. The one or more non-transitory computer-readable storage media of claim 1, wherein the formatting comprises replacing specific identifiers of the at least a portion of the performance information with generic identifiers.

6. The one or more non-transitory computer-readable storage media of claim 5, wherein the specific information comprises a table identifier or a field identifier.

7. The one or more non-transitory computer-readable storage media of claim 1, wherein the machine learning model comprises a Continuous Bag of Words or Skip-Gram model.

8. The one or more non-transitory computer-readable storage media of claim 1, wherein the machine learning model uses word embeddings.

9. The one or more non-transitory computer-readable storage media of claim 1, the processing further comprising:
    monitoring performance of the software;
    determining that a performance issue has occurred; and
    triggering generation of the performance information.

10. The one or more non-transitory computer-readable storage media of claim 1, the processing further comprising:
    determining a plurality of solutions as potentially relevant to the performance issue or bug based on the classification result;
    ranking the plurality of solutions, wherein the returned at least one identified solution is the highest ranked solution.

11. The one or more non-transitory computer-readable storage media of claim 1, the processing further comprising:
    determining a first plurality of solutions as potentially relevant to the performance issue or bug based on the classification result; and
    ranking the first plurality of solutions, wherein returning at least one identified solution comprises returning a ranked list comprising a plurality of the ranked solutions.

12. The one or more non-transitory computer-readable storage media of claim 1, the processing further comprising:
    receiving user input of a solution to a performance issue or bug corresponding to the classification result; and
    adding the solution to a solution database, wherein the added solution is available for association with later classification results.

13. The one or more non-transitory computer-readable storage media of claim 1, the processing further comprising:
    receiving user input identifying the solution as responsive or not responsive to the performance issue or bug; and
    adjusting an association between the classification result and the solution based on the user input.

14. The one or more non-transitory computer-readable storage media of claim 1, the processing further comprising:
categorizing the performance information; and
selecting a classifier to which the formatted performance information will be provided based on the categorization.

15. The one or more non-transitory computer-readable storage media of claim 1, the processing further comprising:
categorizing the performance information;
determining a formatting rule for a category assigned to the performance information; and
selecting performance information associated with one or more software operations based on the formatting rule.

16. The one or more non-transitory computer-readable storage media of claim 15, the processing further comprising, for each of a plurality of software operations of the performance information:
comparing at least one performance parameter associated with the software operation with a threshold value; and
selecting the operation for formatting if the at least one performance parameter violates a threshold established for the at least one performance parameter and the software operation.

17. The one or more non-transitory computer readable storage media of claim 1, wherein returning an indication that a solution was not identified comprising returning an investigation target, wherein the investigation target comprises a program or program component that may be associated with the performance issue or bug.

18. The one or more non-transitory computer-readable storage media of claim 17, the processing further comprising:
receiving user input identifying the target as responsive or not responsive to the performance issue or bug; and
adjusting an association between the classification result and the target based on the user input.

19. A computing system that implements a performance analysis and recommendation system, the computing system comprising:
memory;
one or more processing units coupled to the memory; and
one or more non-transitory computer readable storage media storing instructions that, when loaded into the memory, cause the one or more processing units to perform operations for:
monitoring at least one software performance metric;
determining that the at least one metric violates a threshold;
causing performance information to be gathered, the performance information comprising at least one performance parameter and at least one software feature associated with the at least one performance parameter;
determining a type associated with the performance information;
retrieving an extraction rule associated with the type;
extracting the at least one performance parameter using the extraction rule;
formatting performance information comprising the at least one performance parameter for submission to a classifier using a machine learning model or a clustering engine;
providing the formatted performance information to the classifier or the clustering engine;
receiving a classification or clustering result for the formatted performance information;
querying a solutions database to determine if the classification or clustering result is associated with a solution; and
based on the determining, returning at least one identified solution or an indication that a solution was not identified.

20. In a computing system comprising a memory and one or more processors, a method of providing a trained classifier using a machine learning model, the classifier configured to analyze software bugs or performance issues, the method comprising:
receiving a plurality of training data objects; each training data object comprising:
performance information associated with software associated with a performance issue or bug and associated with software execution during the occurrence of the performance issue or bug, the performance information comprising at least one performance parameter and at least one software feature associated with the at least one performance parameter;
at least one performance indicator, the at least one performance indicator associated with a solution to the performance issue or bug; and
at least one solution to the performance issue or bug;
for the plurality of training data objects, formatting at least a portion of the performance information for submission to a machine learning model; and
training a machine learning model with the formatted performance information to provide a trained classifier that outputs a performance indicator in response to an input test data object, the input test data object comprising performance information, wherein the output performance indicator can be submitted to a solutions database to provide a suggested solution or an indication that a solution was not identified.

* * * * *